(12) United States Patent
Kim

(10) Patent No.: US 12,429,901 B2
(45) Date of Patent: Sep. 30, 2025

(54) NEURAL PROCESSOR, NEURAL PROCESSING DEVICE AND CLOCK GATING METHOD THEREOF

(71) Applicant: REBELLIONS INC., Seongnam-si (KR)

(72) Inventor: Hongyun Kim, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 18/612,806

(22) Filed: Mar. 21, 2024

(65) Prior Publication Data

US 2024/0329683 A1    Oct. 3, 2024

(30) Foreign Application Priority Data

Mar. 30, 2023   (KR) ................. 10-2023-0042272

(51) Int. Cl.
*G06F 1/06* (2006.01)
*G06F 1/08* (2006.01)
*G06F 1/12* (2006.01)

(52) U.S. Cl.
CPC .............. *G06F 1/06* (2013.01); *G06F 1/08* (2013.01); *G06F 1/12* (2013.01)

(58) Field of Classification Search
CPC .................................... G06F 1/12; G06F 1/10
See application file for complete search history.

(56) References Cited

U.S. PATENT DOCUMENTS

| | | | | |
|---|---|---|---|---|
| 5,953,237 A | * | 9/1999 | Indermaur | G06F 9/3869 |
| | | | | 702/186 |
| 9,501,129 B2 | * | 11/2016 | Sistla | G06F 1/324 |
| 2005/0028018 A1 | * | 2/2005 | Shikata | G06F 1/12 |
| | | | | 713/400 |
| 2015/0082070 A1 | * | 3/2015 | Bose | G06F 1/26 |
| | | | | 713/324 |
| 2016/0013643 A1 | * | 1/2016 | Park | G06F 1/28 |
| | | | | 713/300 |
| 2019/0101952 A1 | | 4/2019 | Diamond et al. | |
| 2020/0081479 A1 | * | 3/2020 | Kalyanam | H03L 7/0802 |
| 2020/0082263 A1 | | 3/2020 | Song et al. | |
| 2021/0255860 A1 | | 8/2021 | Morrison et al. | |
| 2022/0050493 A1 | * | 2/2022 | Lee | G06F 1/3296 |
| 2022/0188073 A1 | | 6/2022 | Bowman et al. | |
| 2022/0222513 A1 | * | 7/2022 | Paramasivam | G06F 1/3237 |
| 2022/0253319 A1 | | 8/2022 | Martin et al. | |
| 2023/0104271 A1 | | 4/2023 | Yoo et al. | |

FOREIGN PATENT DOCUMENTS

| | | |
|---|---|---|
| KR | 10-2020-0029661 A | 3/2020 |
| KR | 10-2022-0053387 A | 4/2022 |
| KR | 10-2023-0047823 A | 4/2023 |

* cited by examiner

*Primary Examiner* — Phil K Nguyen

(74) *Attorney, Agent, or Firm* — BROADVIEW IP LAW, PC

(57) ABSTRACT

Provided are a neural processor, a neural processing device, and a clock gating method thereof, which perform clock gating for a plurality of compute units based on a data flow architecture, in which the neural processor includes at least one neural core that processes at least one task, and a clock controller that selectively gates, according to a data flow architecture of the at least one task, a clock signal provided to the at least one neural core.

15 Claims, 33 Drawing Sheets

NEURAL PROCESSOR, NEURAL PROCESSING DEVICE AND CLOCK GATING METHOD THEREOF

CROSS-REFERENCE TO RELATED APPLICATION

This application claims priority under 35 U.S.C. § 119 to Korean Patent Application No. 10-2023-0042272, filed in the Korean Intellectual Property Office on Mar. 30, 2023, the entire contents of which are hereby incorporated by reference.

TECHNICAL FIELD

The present disclosure relates to a neural processor, a neural processing device, and a clock gating method thereof. Specifically, one or more examples of the disclosure relate to a neural processor, a neural processing device, and a clock gating method thereof, which perform clock gating for a plurality of compute units based on a data flow architecture.

BACKGROUND

In recent years, artificial intelligence (AI) has been discussed as the most promising technology worldwide as a core technology of the Fourth Industrial Revolution. The biggest challenge of the artificial intelligence would be computing performance. For the artificial intelligence that realizes human learning, reasoning, perception, and performance of natural language, the speed of processing big data is the key factor.

In the early days of the artificial intelligence learning, the central processing units (CPUs) or graphics processing units (GPUs) of the traditional computers are used for deep learning and inference, but there is a limit to use them in the deep learning and inference with high workload, and the neural processing unit (NPU) that is structurally specialized for deep learning work is in the spotlight.

The neural processing unit has a plurality of compute units inside, and each compute unit operates in parallel, thereby increasing computation efficiency. However, when a plurality of compute units are operated in parallel, power consumption increases in proportion to the number of compute units, and a driving method capable of reducing the power consumption is required.

SUMMARY

In order to solve one or more problems (e.g., the problems described above and/or other problems not explicitly described herein), the present disclosure provides a neural processor that performs clock gating for a plurality of compute units based on a data flow architecture.

The present disclosure also provides a neural processing device that performs clock gating for a plurality of compute units based on a data flow architecture.

The present disclosure also provides a clock gating method of the neural processor that performs clock gating for a plurality of compute units based on a data flow architecture.

The objects of the present disclosure are not limited to the objects described above, and other objects and advantages of the present disclosure that are not described can be understood by the following description and will be more clearly understood by the examples of the present disclosure. In some embodiments, it will be readily apparent that the objects and advantages of the disclosure can be realized by the means and combinations thereof indicated in the claims.

A neural processor according to some aspects of the present disclosure includes at least one neural core that processes at least one task, and a clock controller that selectively gates, according to a data flow architecture of the at least one task, a clock signal provided to the at least one neural core.

In some embodiments, the clock controller may include a master clock gate that receives the clock signal from an outside, and at least one slave clock gate that receives the clock signal from the master clock gate, provides the clock signal to a corresponding neural core, and selectively gates the provided clock signal.

In some embodiments, the at least one neural core may include a processing module that performs a computation, and an operation controller that identifies an operation state of the processing module based on the data flow architecture, the operation controller may generate an operation state signal based on the operation state of the processing module, and the at least one slave clock gate may receive the operation state signal from the operation controller of the corresponding neural core and gates, based on the operation state signal, the clock signal provided to the processing module of the corresponding neural core.

In some embodiments, the operation state signal may indicate a busy state, a wait state, or a quiesce state of the at least one neural core, and the at least one slave clock gate may gate the clock signal provided to the processing module of the corresponding neural core if a state of the corresponding neural core is the wait state or the quiesce state.

In some embodiments, the at least one slave clock gate may provide a clock signal for an operation of the operation controller even if the clock signal provided to the processing module is gated.

In some embodiments, the at least one neural core may include first to n-th neural cores that sequentially process first to n-th tasks according to the data flow architecture, the at least one slave clock gate may include first to n-th slave clock gates corresponding to the first to n-th neural cores, the n-th neural core that performed the n-th task may provide an n-th task completion signal to the n-th slave clock gate and the master clock gate, and said n may be a natural number more than or equal to 2.

In some embodiments, the master clock gate may gate the clock signal provided to the first to n-th neural cores in response to the n-th task completion signal.

In some embodiments, the n-th operation controller of the n-th neural core may wait for an n−1-th task completion signal of an n−1-th neural core, which is a preceding neural core, according to the data flow architecture, and the n-th operation controller may switch the operation state of the n-th processing module of the n-th neural core from an idle state to a busy state in response to the n−1-th task completion signal, and transmit the operation state signal switched to the busy state to the n-th slave clock gate, in order to provide a clock signal required for an operation of the n-th processing module.

In some embodiments, the neural processor may further include a task manager that distributes the at least one task to the at least one neural core according to the data flow architecture, in which the clock controller may selectively provide the clock signal provided to the at least one neural core based on a clock control signal provided from the task manager.

In some embodiments, the clock control signal may include information on a neural core to which the at least one task is distributed, and the clock controller may provide, according to the clock control signal, the clock signal to the neural core to which the at least one task is distributed.

A neural processing device according to some aspects of the present disclosure may include a command processor that configures a task group including at least one task for processing a provided command so as to define a data flow architecture, at least one neural processor including at least one neural core for processing the task according to the defined data flow architecture, and an L2 clock controller that selectively gates, based on the data flow architecture, a clock signal provided to the neural processor, in which the neural processor may include an L1 clock controller that selectively gates, according to the data flow architecture, the clock signal provided to the at least one neural core.

In some embodiments, the L1 clock controller may include a master clock gate that receives the clock signal from an outside, and at least one slave clock gate that receives the clock signal from the master clock gate, provides the clock signal to a corresponding neural core, and selectively gates the provided clock signal.

In some embodiments, the at least one neural core may include a processing module that performs a computation, and an operation controller that controls an operation of the processing module based on the data flow architecture, the operation controller may generate an operation state signal based on the operation state of the processing module, and the at least one slave clock gate may receive the operation state signal from the operation controller of the corresponding neural core and gates, based on the operation state signal, the clock signal provided to the processing module of the corresponding neural core.

In some embodiments, the operation state signal may indicate a busy state, a wait state, or a quiesce state of the at least one neural core, the at least one slave clock gate may gate the clock signal provided to the processing module of the corresponding neural core if the corresponding neural core is in the wait or quiesce state, and the at least one slave clock gate may provide the clock signal for an operation of the operation controller even if the clock signal provided to the processing module is gated.

In some embodiments, the at least one neural core may include first to n-th neural cores that sequentially process first to n-th tasks according to the data flow architecture, the at least one slave clock gate includes first to n-th slave clock gates corresponding to the first to n-th neural cores, the n-th neural core that performed the n-th task provides an n-th task completion signal to the n-th slave clock gate and the master clock gate, the master clock gate may gate clock signals provided to the first to n-th neural cores in response to the n-th task completion signal, and said n may be a natural number more than or equal to 2.

In some embodiments, the n-th operation controller of the n-th neural core may wait for an n−1-th task completion signal of an n−1-th neural core, which is a preceding neural core, according to the data flow architecture, and the n-th operation controller may switch the operation state of the n-th processing module of the n-th neural core from idle to busy state in response to the n−1-th task completion signal, and transmit the operation state signal switched to the busy state to the n-th slave clock gate to provide a clock signal required for an operation of the n-th processing module.

The L2 clock controller may be configured to selectively provide the clock signal to one of the at least one neural processor to which the task group is distributed, in response to a first clock control signal provided from the command processor.

In some embodiments, the neural processor may further include a task manager that distributes the at least one task to the at least one neural core according to the data flow architecture, in which the L1 clock controller may selectively provide the clock signal to the at least one neural core based on a second clock control signal provided from the task manager.

The clock gating method of a neural processor according to some aspects of the present disclosure may include receiving at least one task, distributing the at least one task to the at least one neural core, and providing a clock signal to the at least one neural core to which the task is distributed, receiving an operation state signal for the at least one neural core to which the task is distributed, and gating the clock signal to the at least one neural core in response to the operation state signal.

In some embodiments, the operation state signal may indicate a busy state, a wait state, or a quiesce state of the at least one neural core, and the gating the clock signal to the at least one neural core in response to the operation state signal may include gating the clock signal if the neural core is in the wait or quiesce state.

The neural processor, the neural processing device, and the clock gating method thereof may be configured to selectively provide the clock signal to the neural processor to which the task group is distributed, and to selectively provide the clock signal to the neural core to which the task is distributed, thereby effectively managing the clock power of the neural processing device.

In some embodiments, the neural processor, the neural processing device, and the clock gating method thereof may be configured to selectively gate the clock signal when the operation of the neural core is completed, thereby further saving power consumption of the neural processing device.

In some embodiments to the effects mentioned above, specific effects of the present disclosure are described below while explaining specific details for carrying out the present disclosure.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
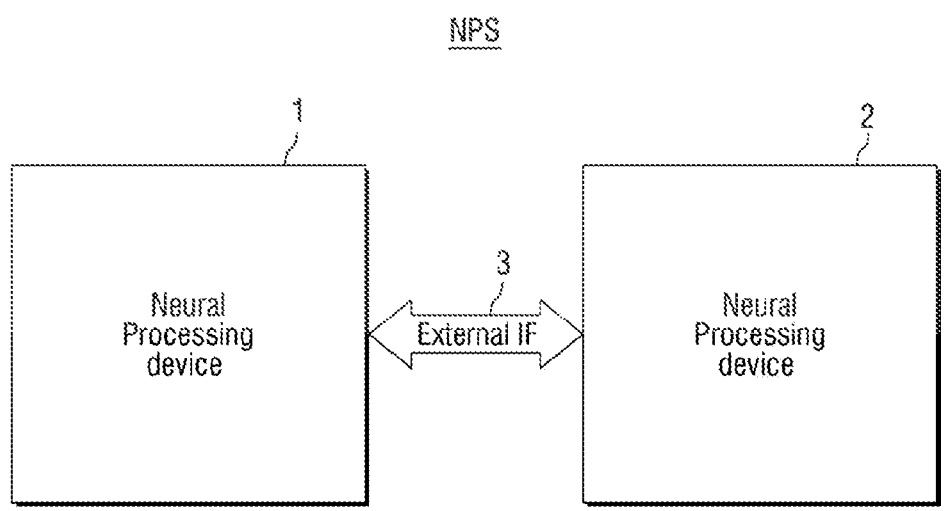
FIG. 1 is a block diagram provided to explain a neural processing system.

The terms or words used herein should not be construed as being limited to their general or dictionary meanings. According to the principle that the inventor may define the concepts of terms or words in order to explain his or her invention in the best way, it should be interpreted with a meaning and concept consistent with the technical idea of the present disclosure. In addition, the examples described herein and the configurations shown in the drawings are merely one example for implementing the present disclosure, and do not completely represent the technical idea of the present disclosure, and accordingly, it should be understood that there may be various equivalents, modifications, and applicable examples that may replace them at the time of filing this application.

Terms such as first, second, A, B and so on may be used herein and the claims to describe a variety of elements, but it is understood that the elements should not be limited to those terms. The expressions are used only for the purpose of distinguishing one element from another. For example, without departing from the scope of the present disclosure, a first component may be referred to as a second component, and similarly, the second component may also be referred to as the first component. The term "and/or" includes a combination of a plurality of related described items or any of a plurality of related described items.

The terms used herein are merely used to describe specific examples and are not intended to limit the invention. Unless otherwise specified, a singular expression includes a plural expression. It should be understood that terms such as "include" or "have" used herein do not preclude the existence or possibility of addition of features, numbers, steps, operations, components, parts, or combinations thereof described herein. Terms such as "circuit," or "circuitry" may refer to a circuit on hardware, but may also refer to a circuit on software.

Unless defined otherwise, all expressions used herein, including technical or scientific expressions, have the same meaning as commonly understood by one of ordinary skill in the art to which the present disclosure pertains.

Expressions such as those defined in commonly used dictionaries should be interpreted as having a meaning consistent with the meaning in the context of the relevant art and are to be interpreted as ideal or overly formal in meaning unless explicitly defined in the present application.

In addition, each configuration, process, step, method, or the like included in each example of the present disclosure may be shared within the scope of not being technically contradictory to each other.

Hereinafter, a neural processing device according to some examples of the disclosure will be described with reference to FIGS. 1 to 32.

FIG. 1 is a block diagram provided to explain a neural processing system.

Referring to FIG. 1, the neural processing system (NPS) may include a first neural processing device 1, a second neural processing device 2, and an external interface 3.

The first neural processing device 1 may be a device that performs computations using an artificial neural network. The first neural processing device 1 may be a device specialized for performing a deep learning computational work, for example. However, aspects are not limited to the above.

The second neural processing device 2 may have a configuration identical or similar to that of the first neural processing device 1. The first neural processing device 1 and the second neural processing device 2 may be connected to each other through the external interface 3 to share data and control signals.

Although FIG. 1 illustrates two neural processing devices, the neural processing system (NPS) according to some examples of the present disclosure is not limited thereto. That is, in the neural processing system (NPS) according to some examples, three or more neural processing devices may be connected to each other through the external interface 3. In addition, conversely, the neural processing system (NPS) according to some examples may include only one neural processing device.

In this case, each of the first neural processing device 1 and the second neural processing device 2 may be a processing device other than the neural processing device. That is, the first neural processing device 1 and the second neural processing device 2 may be a graphics processing unit (GPU), a central processing unit (CPU), or other types of processing devices, respectively. Hereinafter, for convenience, the first neural processing device 1 and the second neural processing device 2 will be described as the neural processing devices.

Figure 2:
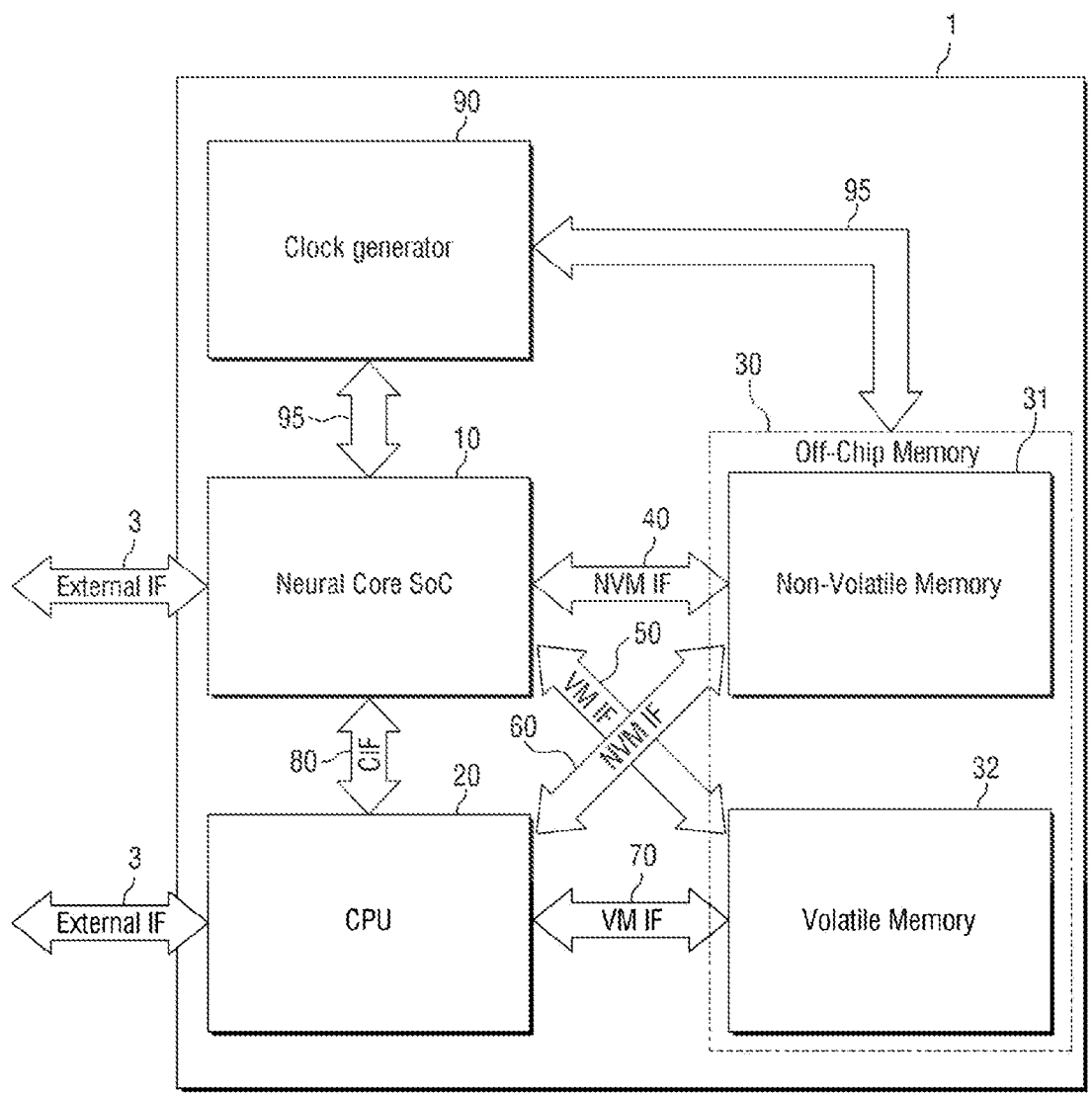
FIG. 2 is a block diagram provided to explain the neural processing device of FIG. 1 in detail.

FIG. 2 is a block diagram provided to explain the neural processing device of FIG. 1 in detail.

Referring to FIG. 2, the first neural processing device 1 may include a neural core SoC 10, a CPU 20, an off-chip memory 30, a first non-volatile memory interface 40, a first volatile memory interface 50, a second non-volatile memory interface 60, a second volatile memory interface 70, a control interface (CIF) 80, a clock generator 90, and a clock interface 95.

The neural core SoC 10 may be a System on Chip device. The neural core SoC 10 may be an artificial intelligence compute unit and may be an accelerator. The neural core SoC 10 may be any one of a graphics processing unit (GPU), a field programmable gate array (FPGA), and an application-specific integrated circuit (ASIC), for example. However, aspects are not limited to the above.

The neural core SoC 10 may exchange data with other external compute units through the external interface 3. In addition, the neural core SoC 10 may be connected to a non-volatile memory 31 and a volatile memory 32 through the first non-volatile memory interface 40 and the first volatile memory interface 50, respectively.

The CPU 20 may be a controller that controls the system of the first neural processing device 1 and executes the program computations. The CPU 20 is a general-purpose compute unit and may have too low efficiency to perform parallel simple computations widely used in deep learning. Accordingly, the neural core SoC 10 may perform computations for deep learning reasoning and training works, thus achieving high efficiency.

The CPU 20 may exchange data with other external compute units through the external interface 3. In addition, the CPU 20 may be connected to the non-volatile memory 31 and the volatile memory 32 through the second non-volatile memory interface 60 and the second volatile memory interface 70, respectively.

The CPU 20 may also transmit a task to the neural core SoC 10 in a command. In this case, the CPU 20 may be a kind of host that gives instructions to the neural core SoC 10. That is, the neural core SoC 10 can efficiently perform parallel computational works such as deep learning works according to the instructions of the CPU 20.

The off-chip memory 30 may be a memory disposed outside a chip of the neural core SoC 10. The off-chip memory 30 may include the non-volatile memory 31 and the volatile memory 32.

The non-volatile memory 31 may be a memory that continuously retains stored information even when there is no power supply. For example, the non-volatile memory 31 may include at least one of a Read-Only Memory (ROM), a Programmable Read-Only Memory (PROM), an Erasable Alterable ROM (EAROM), an Erasable Programmable Read-Only Memory (EPROM), an Electrically Erasable Programmable Read-Only Memory (EEPROM) (e.g., a NAND flash memory, a NOR flash memory), an Ultra-Violet Erasable Programmable Read-Only Memory (UVE-PROM), a Ferroelectric Random Access Memory (FeRAM), a Magnetoresistive Random Access Memory (MRAM), a Phase-change Random Access Memory (PRAM), a silicon-oxide-nitride-oxide-silicon (SONOS), a Resistive Random Access Memory (RRAM), a Nanotube Random Access Memory (NRAM), a magnetic computer storage devices such as hard disks, and a magnetic computer storage device (e.g., hard disk, diskette drive, magnetic tape), an optical disk drive, or 3D XPoint memory. However, aspects are not limited to the above.

Unlike the non-volatile memory 31, the volatile memory 32 may be a memory that continuously requires power to maintain stored information. For example, the volatile memory 32 may include at least one of a Dynamic Random Access Memory (DRAM), a Static Random Access Memory (SRAM), a Synchronous Dynamic Random Access Memory (SDRAM), and a Double Data Rate SDRAM (DDR SDRAM). However, aspects are not limited to the above.

For example, each of the first non-volatile memory interface 40 and the second non-volatile memory interface 60 may include at least one of a Parallel Advanced Technology Attachment (PATA), a Small Computer System Interface (SCSI), a Serial Attached SCSI (SAS), a Serial Advanced Technology Attachment (SATA), and a PCI Express (PCIe). However, aspects are not limited to the above.

For example, each of first volatile memory interface 50 and the second volatile memory interface 70 may be at least one of a Single Data Rate (SDR), a Double Data Rate (DDR), a Quad Data Rate (QDR), an extreme Data Rate (XDR), and an octal data rate (ODR). However, aspects are not limited to the above.

The control interface 80 may be an interface for transmitting control signals between the CPU 20 and the neural core SoC 10. The control interface 80 may transmit a command of the CPU 20 and transmit a response of the neural core SoC 10 to the command. For example, the control interface 80 may be PCI Express (PCIe), but is not limited thereto.

The clock generator 90 may generate at least one reference clock for driving the neural core SoC 10. The clock generator 90 may include an oscillator and at least one phase lock loop (PLL). The oscillator generates clocks, and the phase lock loop (PLL) may change a frequency of the clocks generated by the oscillator and output a reference clock. In some aspects, a plurality of PLLs may be included in the clock generator 90, and the plurality of PLLs may generate reference clocks having different frequencies.

The clock interface 95 may be provided to transmit a reference clock between the clock generator 90 and the neural core SoC 10. The clock generator 90 may transmit the reference clock generated by the clock generator 90 to the neural core SoC 10, and transmit a response of the neural core SoC 10 to the reference clock. For example, the clock generator 90 may change the frequency of the reference clock in response to a request to change the clock frequency of the neural core SoC 10.

In addition, FIG. 2 illustrates the clock interface 95 connecting the clock generator 90 and the neural core SoC 10 and connecting the clock generator 90 and the off-chip memory 30, but aspects are not limited thereto. In some aspects, the clock generator 90 may generate a clock required for the operation of the main components of the neural processing device. For example, the clock generator 90 may generate a clock signal having a frequency for the operation of at least one of the neural core SoC 10, the CPU 20, and the off-chip memory 30.

In addition, FIG. 2 illustrates the clock generator 90 disposed inside the first neural processing device 1, but aspects are not limited thereto. In some aspects, the clock generator 90 may be disposed outside the first neural processing device 1, and the first neural processing device 1 may receive a reference clock from the clock generator 90 disposed outside.

Figure 3:
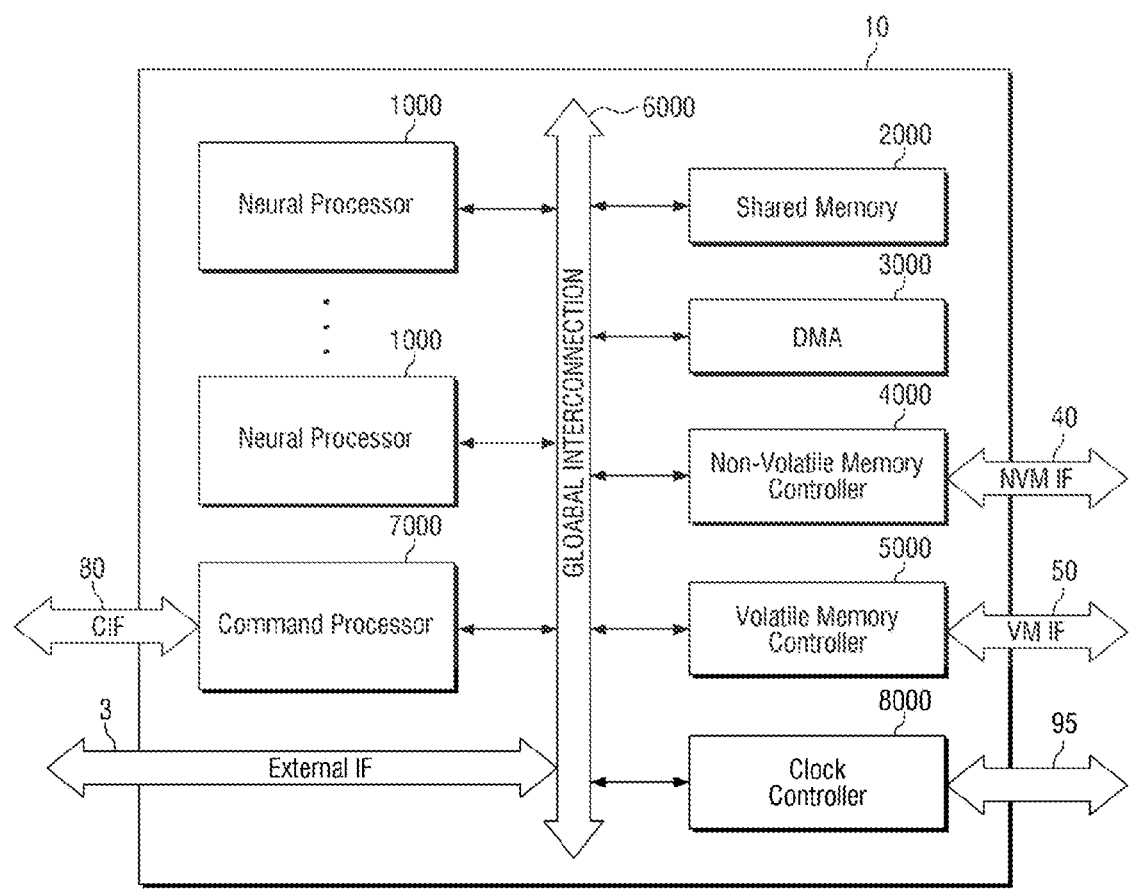
FIG. 3 is a block diagram provided to explain the neural core SoC of FIG. 2 in detail.

FIG. 3 is a block diagram provided to explain the neural core SoC of FIG. 2 in detail.

Referring to FIGS. 2 and 3, the neural core SoC 10 may include at least one neural processor 1000, a shared memory 2000, a Direct Memory Access (DMA) 3000, a non-volatile memory controller 4000, a volatile memory controller 5000, a global interconnection 6000, a command processor 7000, and a clock controller 8000. In this case, the command processor 7000 and the clock controller 8000 may be referred to as a command processor circuit and a clock controller circuit, but for convenience, they are uniformly referred to as a command processor and a clock controller, respectively. Furthermore, the command processor 7000 and the clock controller 8000 may be implemented as circuits (or circuitries).

The command processor 7000 and the clock controller 8000 may be implemented in software on the off-chip memory 30, and in particular, on the volatile memory 32 of FIG. 2. However, aspects are not limited to the above, and it may be implemented as separate hardware. Furthermore, each of the command processor 7000 and the clock controller 8000 may be partially implemented in software and partially in hardware. In this case, the part implemented in hardware may increase the computing speed of the command processor 7000 and the clock controller 8000.

The neural processor 1000 may be a compute unit that directly performs computational works. If there are a plurality of neural processors 1000, the computational works may be allocated to each of the neural processors 1000. Each of the neural processors 1000 may be connected to each other through the global interconnection 6000.

The shared memory 2000 may be a memory shared by several neural processors 1000. The shared memory 2000 may store data of each neural processor 1000. In addition, the shared memory 2000 may receive data from the off-chip memory 30, temporarily store the data, and transmit the data to each neural processor 1000. Conversely, the shared memory 2000 may receive data from the neural processor 1000, temporarily store the data, and transmit the data to the off-chip memory 30 of FIG. 2.

The shared memory 2000 may require a relatively fast memory. Accordingly, the shared memory 2000 may include SRAM, for example. However, aspects are not limited to the above. That is, the shared memory 2000 may include DRAM.

The shared memory 2000 may be a memory corresponding to an SoC level, that is, to level 2 (L2). Accordingly, the shared memory 2000 may be defined as the L2 shared memory.

The DMA 3000 may directly control data movement without requiring the CPU 20 or the neural processor 1000 to control input/output of data. Accordingly, the DMA 3000 may control the data movement between memories to minimize the number of interrupts of the CPU 20 or the neural processor 1000.

The DMA 3000 may control the data movement between the shared memory 2000 and the off-chip memory 30. The non-volatile memory controller 4000 and the volatile memory controller 5000 may perform the movement of data through the authority of the DMA 3000.

The non-volatile memory controller 4000 may control read or write work for the non-volatile memory 31. The non-volatile memory controller 4000 may control the non-volatile memory 31 through the first non-volatile memory interface 40.

The volatile memory controller 5000 may control the read or write work for the volatile memory 32. In addition, the volatile memory controller 5000 may perform a refresh work of the volatile memory 32. The volatile memory controller 5000 may control the volatile memory 32 through the first volatile memory interface 50.

The command processor 7000 may be connected to the control interface 80. The command processor 7000 may receive a control signal from the CPU 20 through the control interface 80. The command processor 7000 may generate a task through a control signal received from the CPU 20 and transmit the task to each neural processor 1000. In addition, the command processor 7000 may receive a task completion report from each neural processor 1000.

The clock controller 8000 may receive a reference clock from the clock generator 90 through the clock interface 95. The clock controller 8000 may generate and distribute clock signals required for the operation of the main components of the neural core SoC 10 based on the reference clock.

In some aspects, the clock signals with which the main components of the neural core SoC 10 are operated may have the same clock frequency, but aspects are not limited thereto. The clock frequencies of the main components of the neural core SoC 10 may be different from each other. The clock controller 8000 may receive a plurality of reference clocks from the clock generator 90 or may perform multiplication on the provided reference clocks to supply clock signals for the operation of the main components of the neural core SoC 10.

In addition, the clock controller 8000 may reset and initialize the operation of the main components of the neural core SoC 10 receiving the clock signal, or perform clock gating to control the power consumption of the main components of the neural core SoC 10.

In addition, in FIG. 3, the clock controller 8000 is illustrated as a separate block, but this is merely an example, and in some aspects, the clock controller 8000 may be included and operated in another configuration (e.g., the command processor 7000).

The global interconnection 6000 may connect at least one neural processor 1000, the shared memory 2000, the DMA 3000, the nonvolatile memory controller 4000, the volatile memory controller 5000, the command processor 7000, and the clock controller 8000 to each other. In addition, the external interface 3 may also be connected to the global interconnection 6000. The global interconnection 6000 may be a path through which data moves between at least one neural processor 1000, the shared memory 2000, the DMA 3000, the non-volatile memory controller 4000, the volatile memory controller 5000, the command processor 7000, the clock controller 8000, and the external interface 3.

The global interconnection 6000 may transmit not only the data but also the control signal, the clock signal, and the synchronization signal for synchronization between the plurality of neural processors 1000. In the neural processing device according to some examples of the disclosure, each neural processor 1000 may directly transmit and receive the synchronization signal. Accordingly, latency due to the transmission of the synchronization signal generated by the command processor 7000 may be minimized.

That is, if there is a plurality of neural processors 1000, there may be dependency of individual works, in which the work of one neural processor 1000 must be completed before the next neural processor 1000 may start a new work.

The end and start of these individual tasks may be confirmed through synchronization signals, but according to the existing technology, the command processor 7000 or the host, that is, the CPU 20 is solely responsible for receiving the synchronization signals and instructing the start of a new work.

However, as the number of neural processors 1000 increases and the dependency of the works is designed more complexly, the number of synchronization signals increase exponentially, and the latency according to each synchronization signal may significantly reduce the efficiency of the works.

Therefore, in the neural processing device according to some examples of the disclosure, instead of the command processor 7000, each neural processor 1000 may directly transmit part of the synchronization signals to the other neural processors 1000 according to the dependency of the work. In this case, compared to the way of managing by the command processor 7000, a plurality of neural processors 1000 may perform synchronization works in parallel, thereby minimizing latency due to synchronization.

In addition, the command processor 7000 also performs work scheduling of the neural processors 1000 according to work dependency, and the overhead of such scheduling may increase significantly as the number of neural processors 1000 increases. Accordingly, in the neural processing device according to some examples of the disclosure, the scheduling work is partially performed by the individual neural processor 1000, which may reduce the scheduling burden and thus improve the performance of the device.

Figure 4:
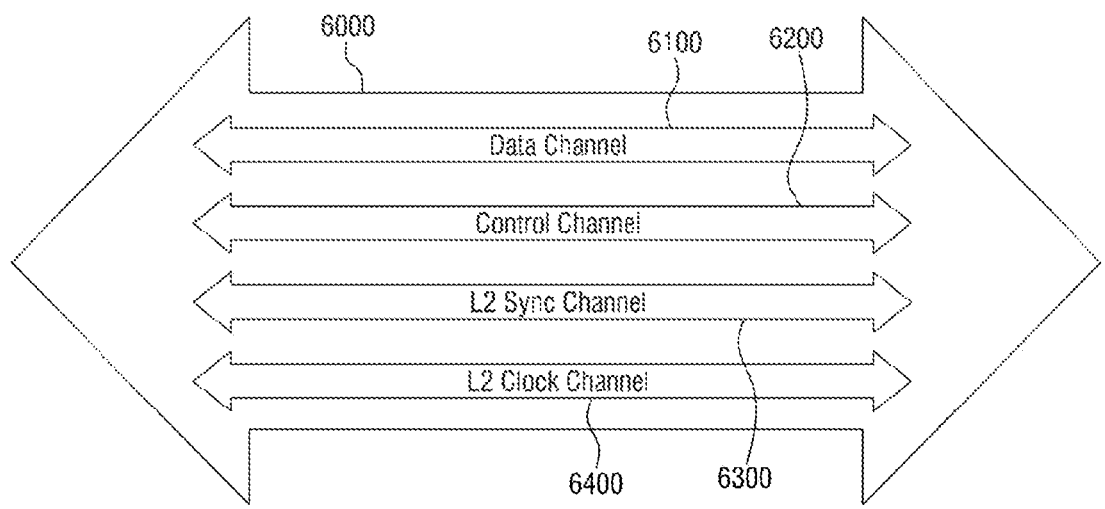
FIG. 4 is a structural diagram provided to explain the global interconnection of FIG. 3 in detail.

FIG. 4 is a structural diagram provided to explain the global interconnection of FIG. 3 in detail.

Referring to FIG. 4, the global interconnection 6000 may include a data channel 6100, a control channel 6200, an L2 sync channel 6300, and an L2 clock channel 6400.

The data channel 6100 may be a private channel for transmitting data. Through the data channel 6100, at least one neural processor 1000, the shared memory 2000, the DMA 3000, the non-volatile memory controller 4000, the volatile memory controller 5000, and the external interface 3 may exchange data with each other.

The control channel 6200 may be a private channel for transmitting the control signals. Through the control channel 6200, at least one neural processor 1000, the shared memory 2000, the DMA 3000, the non-volatile memory controller 4000, the volatile memory controller 5000, the command processor 7000, the clock controller 8000, and the external interface 3 may exchange the control signals with each other. In particular, the command processor 7000 may transmit various control signals to each of the neural processors 1000.

The L2 sync channel 6300 may be a private channel for transmitting the synchronization signals. Through the L2 sync channel 6300, at least one neural processor 1000, the shared memory 2000, the DMA 3000, the non-volatile memory controller 4000, the volatile memory controller 5000, the command processor 7000, and the external interface 3 may exchange the synchronization signals with each other.

The L2 sync channel 6300 may be set as a private channel inside the global interconnection 6000 to allow fast transmission of the synchronization signals without overlapping with other channels. Accordingly, the neural processing device according to some examples may smoothly perform synchronization using the existing global interconnection 6000 without requiring new wiring work.

The L2 clock channel 6400 may be a private channel for transmitting the clock signals. Through the L2 clock channel 6400, the clock signal may be transmitted from the clock controller 8000 to at least one of the other components such as the at least one neural processor 1000, the shared memory 2000, the DMA 3000, the nonvolatile memory controller 4000, the volatile memory controller 5000, and the command processor 7000. In particular, the clock controller 8000 may transmit the clock signal to each of the neural processors 1000.

Figure 5:
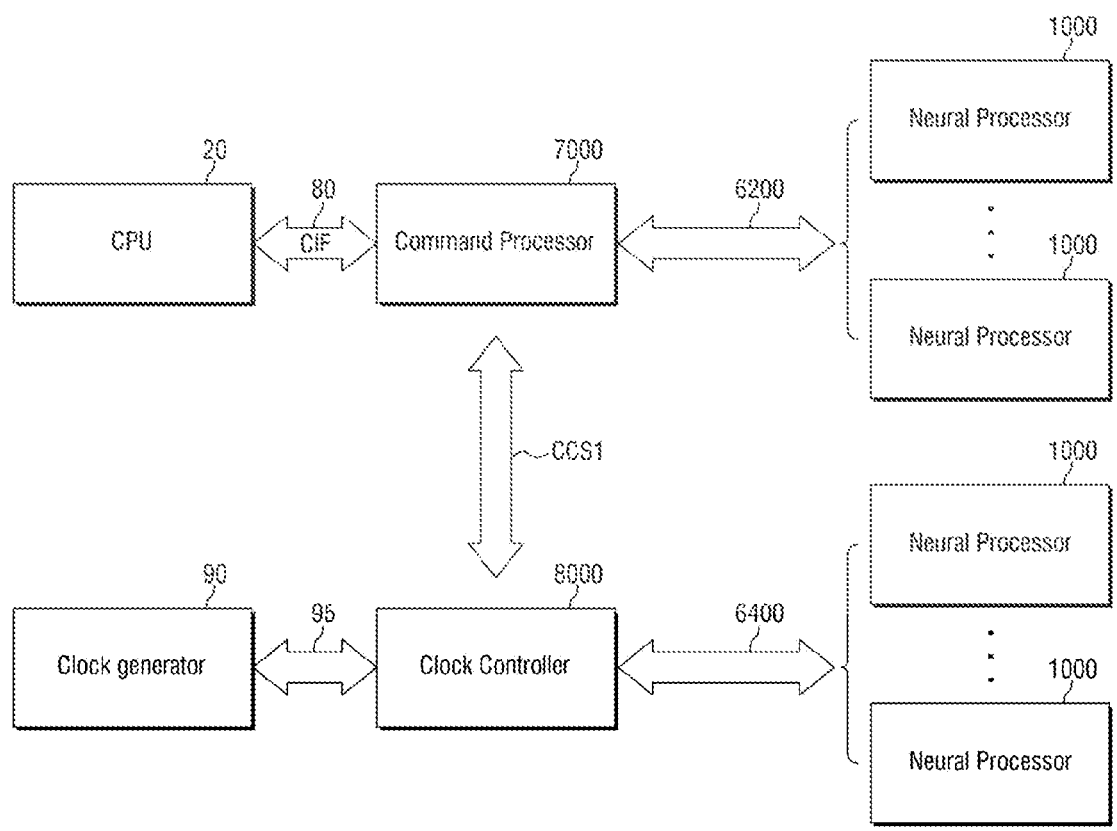
FIG. 5 is a block diagram provided to explain a flow of a control signal and a flow of a clock signal of the neural processing device of FIG. 1.

FIG. 5 is a block diagram provided to explain a flow of a control signal and a flow of a clock signal of the neural processing device of FIG. 1.

Referring to FIG. 5, the CPU 20 may transmit the control signal to the command processor 7000 through the control interface 80. The control signal may be a signal that instructs to perform each operation including a computational work, a data load/store work, etc.

The command processor 7000 may receive the control signal and transmit the control signal to at least one neural processor 1000 through the control channel 6200. Each control signal may be stored as each task in the neural processor 1000.

The clock generator 90 may transmit the reference clock to the clock controller 8000 through the clock interface 95. The clock controller 8000 may generate a clock signal required for the operation of at least one neural processor 1000 based on the reference clock. The clock controller 8000 may transmit the generated clock signal to at least one neural processor 1000.

In some aspects, the clock controller 8000 may perform gating on the clock signal provided to at least one neural processor 1000 based on the clock control signal CCS1 of the command processor 7000. The clock controller 8000 may enable the clock signal when there is a work to be performed by the component and may disable the clock signal when there is no work. That is, the clock controller 8000 may control so that the clock signals are selectively enabled or disabled to specific components, units, sub-components, sub-units, etc. within the neural core SoC 10.

In the neural core SoC 10, clock power may consume a significant portion of total chip power, and it is expected that, as clock speeds increase, the sharing of power potentially utilized by the system clock would increase. Indeed, in some cases, clock power may consume most of the total chip power or more. Effective power management may be provided through clock gating for the main components of the neural core SoC 10, thereby significantly saving power consumption.

The clock gating performed in aspects of the present disclosure may be performed on the neural processor 1000. That is, the clock controller 8000 may control gating of the clock signal provided to the neural processor 1000 in which a work is currently not performed, and as the clock signal is not provided to the neural processor 1000, operations on all main components included in the neural processor 1000 may be disabled.

However, aspects are not limited to the above, and the clock gating may be performed on at least one neural core included in the neural processor 1000, and the neural processor 1000 may include a clock controller that controls a clock signal provided to the neural core.

Figure 6:
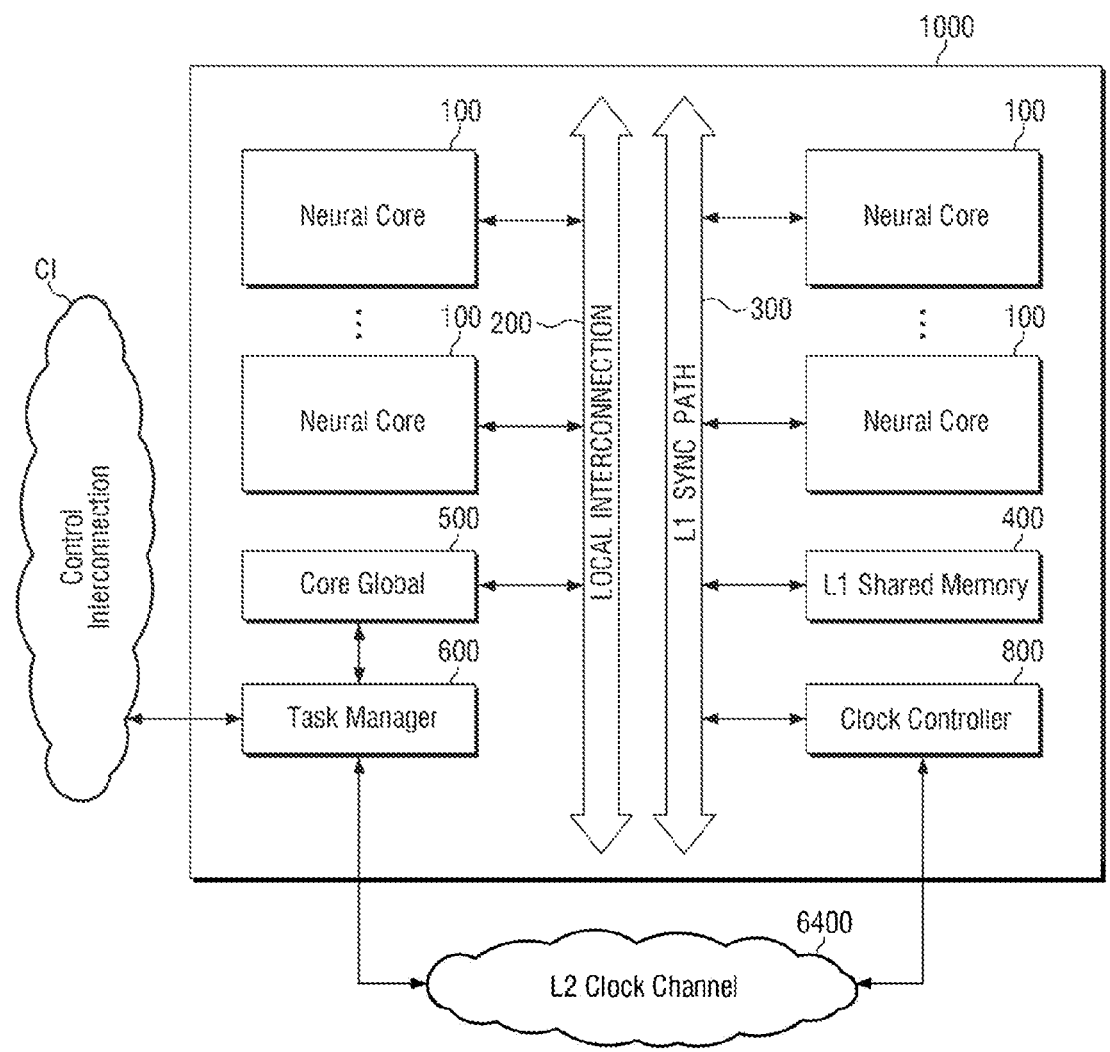
FIG. 6 is a block diagram provided to explain the neural processor of FIG. 3 in detail.

FIG. 6 is a block diagram provided to explain the neural processor of FIG. 3 in detail.

Referring to FIGS. 3 and 6, the neural processor 1000 may include at least one neural core 100, a local interconnection 200, an L1 sync path 300, an L1 shared memory 400, a core global 500, a task manager 600, an L1 LSU 700, and a clock controller 800. At this time, the clock controller 800, the L1

LSU 700, the task manager 600, and the core global 500 may also be referred to as a clock controller circuit, an L1 LSU circuit, a task manager circuit, and a core global circuit, respectively, but for convenience, the terms are uniformly referred to as a clock controller, an L1 LSU, a task manager, and a core global. Further, the clock controller 800, the L1 LSU 700, the task manager 600, and the core global 500 may be implemented as a circuit (or circuitry).

At least one neural core 100 may divide and perform the work of the neural processor 1000. For example, there may be eight neural cores 100. However, aspects are not limited to the above. Although it is shown in FIGS. 3 and 5 that several neural cores 100 are included in the neural processor 1000, aspects are not limited to the above. That is, the neural processor 1000 may be configured with only one neural core 100.

The neural core 100 may receive task information from the core global 500 and perform a task according to the task information. The task may be defined by the control signals, and the task may be either a compute operation or a memory operation. The memory operation may be, for example, any one of micro DMA (µDMA), LP micro DMA (low priority µDMA), store µDMA (STµDMA), and pre-processing works.

The L1 shared memory 400 may be a memory shared by each neural core 100 in the neural processor 1000. The L1 shared memory 400 may store data of each neural core 100. In addition, the L1 shared memory 400 may receive data from the shared memory 2000 of FIG. 4, temporarily store the data, and transmit the data to each neural core 100. Conversely, the L1 shared memory 400 may receive data from the neural core 100, temporarily store the data, and transmit the data to the shared memory 2000 of FIG. 3.

The L1 shared memory 400 may be a memory corresponding to the neural processor level, that is, to level 1 (L1). The L2 shared memory, that is, the shared memory 2000 may be shared by the neural processor 1000, and the L1 shared memory 400 may be shared by the neural core 100.

The L1 LSU 700 may receive at least one of data, control signals, and synchronization signals from the outside through the global interconnection 6000. The L1 LSU 700 may transmit at least one of the data, the control signals, and the synchronization signals received by the L1 shared memory 400. Likewise, the L1 LSU 700 may transmit at least one of the data, the control signals, and the synchronization signals to the outside through the global interconnection 6000. In addition, for each of the neural cores 100, the L1 LSU 700 may transmit and receive at least one of the data, the control signals, and the synchronization signals.

The neural core 100 may receive task information from the core global 500 and perform a task according to the task information. The task may be a work related to the computational work or the memory operation. The task may be defined by the control signals. The task information is information on the task, and it may be information on type of task, form of task, additional information on task, etc.

The neural core 100 may transmit a completion signal indicating completion of the task to the core global 500.

The task manager 600 may receive a task from the control interconnection (CI). The control interconnection (CI) may be a general term for the transmission interfaces that transmit the tasks from the command processor 7000. That is, the control interconnection (CI) may include the control channel 6200 and the local interconnection 200.

The task manager 600 may receive a task, generate task information, and transmit the result to the core global 500.

In addition, the task manager 600 may receive a completion signal through the core global 500, generate a completion report accordingly, and transmit the result to the command processor 7000 through the control interconnection (CI).

The core global 500 may be a wire structure connected in hardware within the neural core 100. Although not illustrated, the core global 500 may be a structure that connects the neural core 100, the L1 shared memory 400, the L1 LSU 700, and the task manager 600. Accordingly, the local interconnection 200 and the L1 sync path 300 may also be included in the core global 500. However, aspects are not limited to the above.

The core global 500 may receive the task information from the task manager 600, transmit the same to the neural core 100, and receive a corresponding completion signal from the neural core 100. The core global 500 may transmit the completion signal to the task manager 600.

The local interconnection 200 may connect at least one neural core 100, the L1 shared memory 400, the core global 500, the task manager 600, and the L1 LSU 700 to each other. The local interconnection 200 may be connected to the global interconnection 6000 of FIG. 3 to transmit the data. In addition, the local interconnection 200 may be a path for the data, control signals, and clock signals moving between at least one neural core 100, the L1 shared memory 400, the core global 500, the task manager 600, and the L1 LSU 700, respectively. Although not shown, the local interconnection 200 may include a data channel for the movement of data, a control channel for the movement of control signals, and a clock channel for the movement of clock signals, between each component of the neural processor 1000. The clock channel included in the local interconnection 200 may be defined as an L1 clock channel, which is a channel provided with a clock signal provided at one level lower than that of the L2 clock channel 6400.

The clock controller 800 may provide a clock signal required for the operation of the main components of the neural processor 1000. The clock controller 800 and the clock controller 8000 may have a hierarchical structure. The clock signal provided from the clock controller 8000 may be provided to the clock controller 800 through the L2 clock channel 6400.

The clock controller 8000 may be a master controller (or root controller), and the clock controller 800 may be a slave controller (or leaf controller) controlled by the master controller. In the following description, the clock controller 8000 is defined as an L2 clock controller, and the clock controller 800 is defined as an L1 clock controller.

The L1 clock controller 800 may receive a clock signal through the clock channel 6400 and provide the received clock signal to the main components of the neural processor 1000. In particular, the L1 clock controller 800 may provide the clock signal to at least one neural core 100 through the L1 clock channel.

In addition, the L1 clock controller 800 may perform selective gating on the clock signal provided to the neural core 100, in response to the clock control signal provided from the task manager 600. The clock gating process and related configuration of the neural core 100 will be described in more detail below.

The L1 sync path 300 may connect at least one neural core 100, the L1 shared memory 400, the core global 500, the task manager 600, and the L1 LSU 700 to each other. The L1 sync path 300 may be a path for the movement of the synchronization signals of at least one neural core 100, the L1 shared memory 400, the core global 500, the task manager 600, and the L1 LSU 700.

The L1 sync path 300 may be physically separated from the local interconnection 200. Unlike the global interconnection 6000, the local interconnection 200 may not have sufficient channels formed therein. In this case, the L1 sync path 300 may be formed separately such that it is possible to perform transfer of the synchronization signal quickly and without delay. The L1 sync path 300 may be used for the synchronization performed at a level that is one level lower than the L2 sync channel 6300 of the global interconnection 6000.

Figure 7:
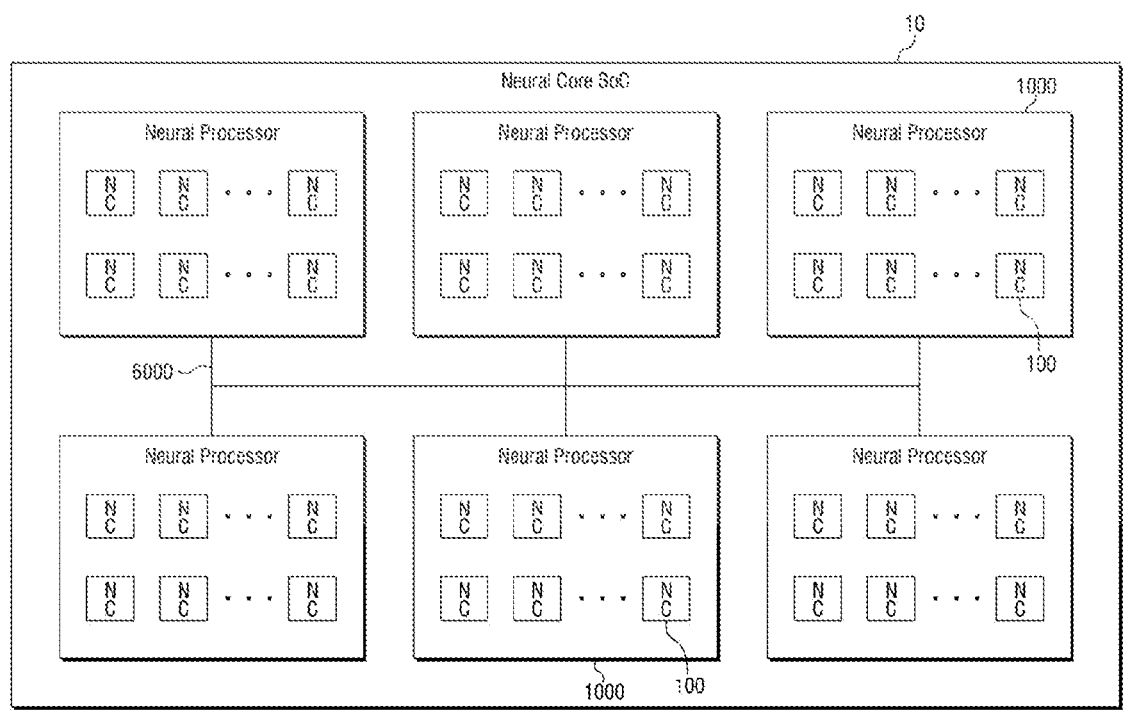
FIG. 7 is a diagram provided to explain a hierarchical structure of a neural processing device.

FIG. 7 is a diagram provided to explain a hierarchical structure of a neural processing device.

Referring to FIG. 7, the neural core SoC 10 may include at least one neural processor 1000. Each neural processor 1000 may transmit data to each other through the global interconnection 6000.

Each neural processor 1000 may include at least one neural core 100. The neural core 100 may be a processing unit optimized for deep learning computational works. The neural core 100 may be a processing unit corresponding to one operation of the deep learning computational work. That is, the deep learning computational work may be expressed as a sequential or parallel combination of several operations. The neural core 100 is a processing unit that may each process one operation, and may be the minimum unit of computation that can be considered for scheduling from a compiler's perspective.

The neural processing device may achieve fast and efficient scheduling and performance of computational works by configuring the minimum unit of computations considered for scheduling from a compiler's perspective and the hardware processing unit on the same scale.

That is, if the hardware processing unit that may be divided is too large compared to the computational work, inefficiency in the computational work may occur when operating the processing unit. Conversely, it is not appropriate to always schedule the processing unit smaller than the operation which is the compiler's minimum scheduling unit, as this may result in scheduling inefficiencies and also increase hardware design costs.

Therefore, the scale of the compiler's scheduling unit and the hardware processing unit may be similarly adjusted to satisfy both the fast computational work scheduling and the efficient computational work performance without wasting hardware resources.

Figure 8:
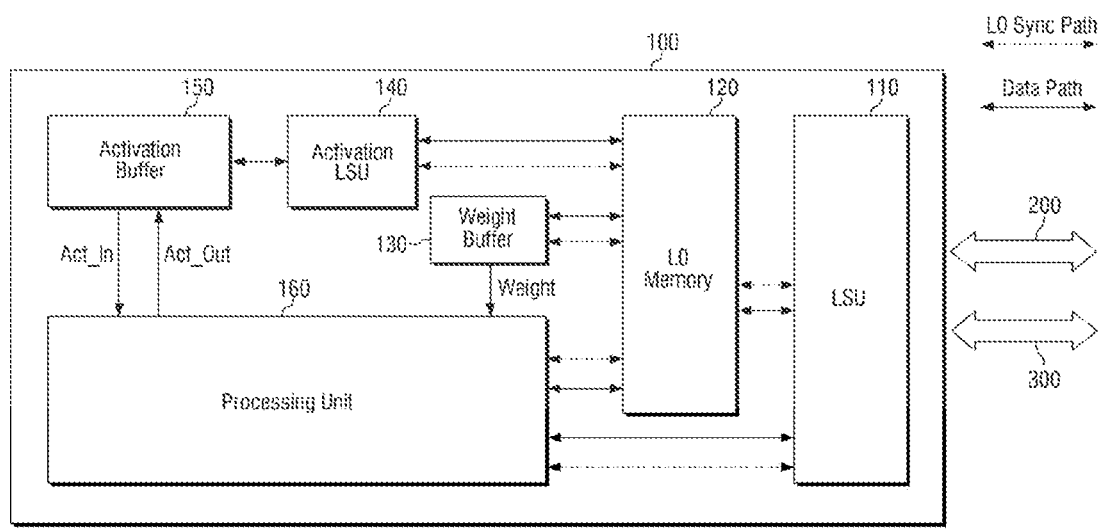
FIG. 8 is a block diagram provided to explain the neural core of FIG. 6 in detail.

FIG. 8 is a block diagram provided to explain the neural core of FIG. 6 in detail.

Referring to FIG. 8, the neural core 100 may include a load/store unit (LSU) 110, an L0 memory 120, a weight buffer 130, an activation LSU 140, an activation buffer 150, and a processing unit 160. The LSU 110 and the activation LSU 140 may also be called an LSU circuit and an activation LSU circuit, respectively, but will be uniformly referred to as the LSU and the activation LSU herein for convenience of description. Further, the LSU 110 and the activation LSU 140 may be implemented as a circuit (or circuitry).

The LSU 110 may receive at least one of data, control signals, and synchronization signals from the outside through the local interconnection 200 and the L1 sync path 300. The LSU 110 may transmit at least one of the data, the control signals, and the synchronization signals received by the L0 memory 120. Likewise, the LSU 110 may transmit at least one of the data, the control signals, and the synchronization signals to the outside through the local interconnection 200 and the L1 sync path 300.

Specifically, a micro DMA work may be a work of the neural core 100 loading program or data from the shared memory 2000 or the off-chip memory 30 to the L0 memory 120. Unlike the typical micro DMA work, the LP micro DMA work may be a work of loading program or data to be used later, rather than the current program or data. Because these works have a low priority, they may be identified differently from the micro DMA works. An ST Micro DMA work may be a store work of the L0 memory 120 of the neural core 100 to store data in the shared memory 2000 or the off-chip memory 30. The pre-processing work may include a work of the CPU 20 to pre-load data such as a large amount of lookup tables.

Figure 9:
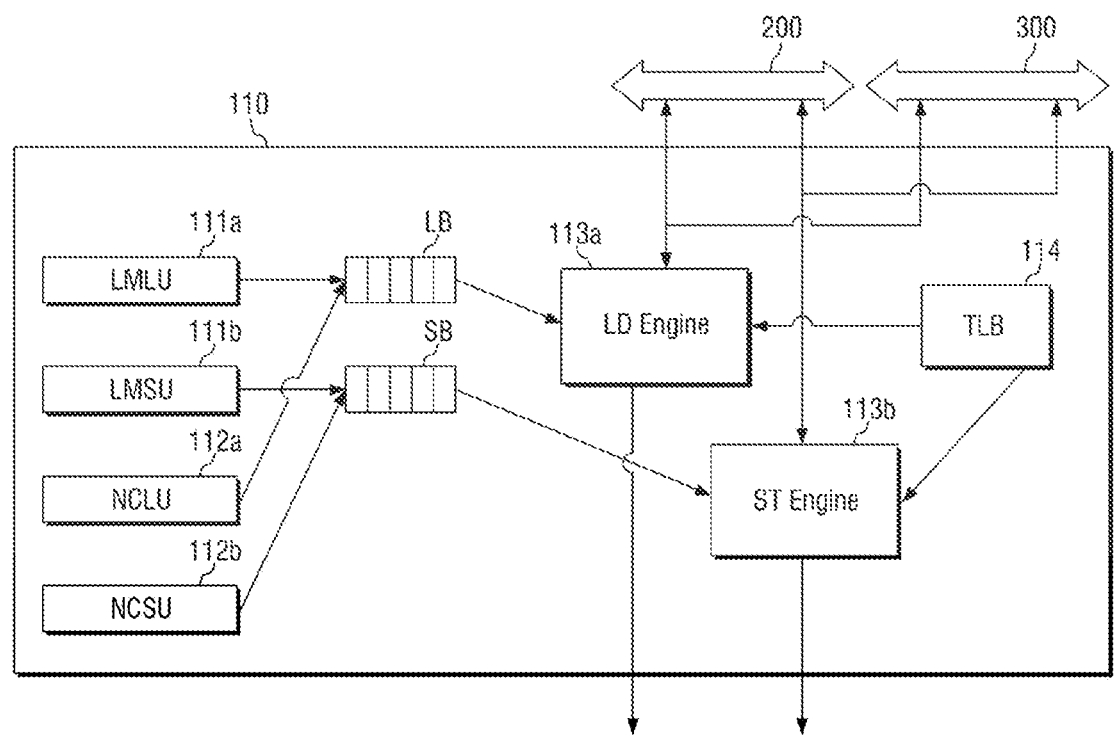
FIG. 9 is a block diagram provided to explain the LSU of FIG. 8 in detail.

FIG. 9 is a block diagram provided to explain the LSU of FIG. 8 in detail.

Referring to FIG. 9, the LSU 110 may include a local memory load unit 111a, a local memory store unit 111b, a neural core load unit 112a, a neural core store unit 112b, a load buffer (LB), and a store buffer (SB), a load engine 113a, a store engine 113b, and a translation index buffer 114. The local memory load unit 111a, the local memory store unit 111b, the neural core load unit 112a, the neural core store unit 112b, the load engine 113a, and the store engine 113b may also be called a local memory unit circuit, a local memory store unit circuit, a neural core load unit circuit, a neural core store unit circuit, a load engine circuit, and a store engine circuit, but will be uniformly referred to as the local memory load unit, the local memory store unit, the neural core load unit, the neural core store unit, the load engine, and the store engine herein for convenience of description. Further, the local memory load unit 111a, the local memory store unit 111b, the neural core load unit 112a, the neural core store unit 112b, the load engine 113a, and the store engine 113b may be implemented as a circuit (or circuitry).

The local memory load unit 111a may fetch a load instruction for the L0 memory 120 and issue the load instruction. If the local memory load unit 111a provides the issued load instruction to the load buffer (LB), the load buffer LB may send the memory access requests to the load engine 113a in order of input.

Further, the local memory store unit 111b may fetch a store instruction for the L0 memory 120 and issue the store instruction. If the local memory store unit 111b provides the issued store instruction to the store buffer (SB), the store buffer (SB) may send the memory access requests to the store engine 113b in order of input.

The neural core load unit 112a may fetch a load instruction for the neural core 100 and issue the load instruction. If the neural core load unit 112a provides the issued load instruction to the load buffer (LB), the load buffer (LB) may send the memory access requests to the load engine 113a in order of input.

In addition, the neural core store unit 112b may fetch a store instruction for the neural core 100 and issue the store instruction. If the neural core store unit 112b provides the issued store instruction to the store buffer (SB), the store buffer SB may send the memory access requests to the store engine 113b in order of input.

The load engine 113a may receive the memory access request and call up the data through the local interconnection 200. The load engine 113a may quickly find the data using the translation table of the recently used logical addresses and physical addresses in the translation index buffer 114. If the logical address of the load engine 113a is not in the translation index buffer 114, the address translation information may be found in another memory.

The store engine 113b may receive the memory access request and call up the data through the local interconnection 200. The store engine 113b may quickly find the data using the translation table of the recently used logical addresses and physical addresses in the translation index buffer 114. If the logical address of the store engine 113b is not in the translation index buffer 114, the address translation information may be found in another memory.

The load engine 113a and the store engine 113b may send a synchronization signal to the L1 sync path 300. The synchronization signal may indicate that the work is completed.

Referring to FIG. 8, the L0 memory 120 may be a memory located within the neural core 100, and the neural core 100 may receive all of input data required for the work from the outside and temporarily store the received data in the L0 memory 120. Further, the L0 memory 120 may temporarily store output data computed by the neural core 100 so as to transmit the same to the outside.

The L0 memory 120 may, by the activation LSU 140, transmit input activation (Act_In) to the activation buffer 150 and receive output activation (Act_Out). In addition to the activation LSU 140, the L0 memory 120 may directly transmit and receive data to and from the processing unit 160. That is, the L0 memory 120 may exchange data with each of the PE array 163 and the vector unit 164. The L0 memory 120 may be a memory corresponding to the neural core level. The L0 memory 120 may be a private memory of the neural core.

The L0 memory 120 may transmit data such as activation or weight through a data path. The L0 memory 120 may transmit and receive synchronization signals through an L0 sync path which is a separate private path. For example, the L0 memory 120 may exchange the synchronization signals with the LSU 110, the weight buffer 130, the activation LSU 140, and the processing unit 160, through the L0 sync path.

The weight buffer 130 may receive weight from the L0 memory 120. The weight buffer 130 may transmit the weight to the processing unit 160. The weight buffer 130 may temporarily store the weight before transmitting the same.

The input activation (Act_In) and the output activation (Act_Out) may refer to input and output values of the layers of the neural network. If the neural network has a plurality of layers, the output value of the previous layer becomes the input value of the next layer, and therefore, the output activation (Act_Out) of the previous layer may be used as the input activation (Act_In) of the next layer.

The weight may refer to a parameter multiplied by the input activation (Act_In) which is input from each layer. The weight is adjusted and confirmed in the deep learning stage, and may be used to derive the output activation (Act_Out) through a fixed value in the inference stage.

The activation LSU 140 may transmit the input activation (Act_In) from the L0 memory 120 to the activation buffer 150 and transmit the output activation (Act_Out) from the activation buffer 150 to the on-chip buffer. That is, the activation LSU 140 may perform both load and store works of the activation.

The activation buffer 150 may provide the input activation (Act_In) to the processing unit 160 and receive the output activation (Act_Out) from the processing unit 160. The activation buffer 150 may temporarily store the input activation (Act_In) and the output activation (Act_Out).

The activation buffer 150 may quickly provide the activation to the processing unit 160 with a large computation load, in particular, to the PE array 163, and quickly receive the activation so as to increase the computing speed of the neural core 100.

The processing unit 160 may be a module that performs computations. The processing unit 160 may perform not only one-dimensional computations but also two-dimensional matrix computations, that is, convolution computations. The processing unit 160 may receive the input activation (Act_In), multiply it by the weight, and add the result to generate the output activation (Act_Out).

Figure 10:
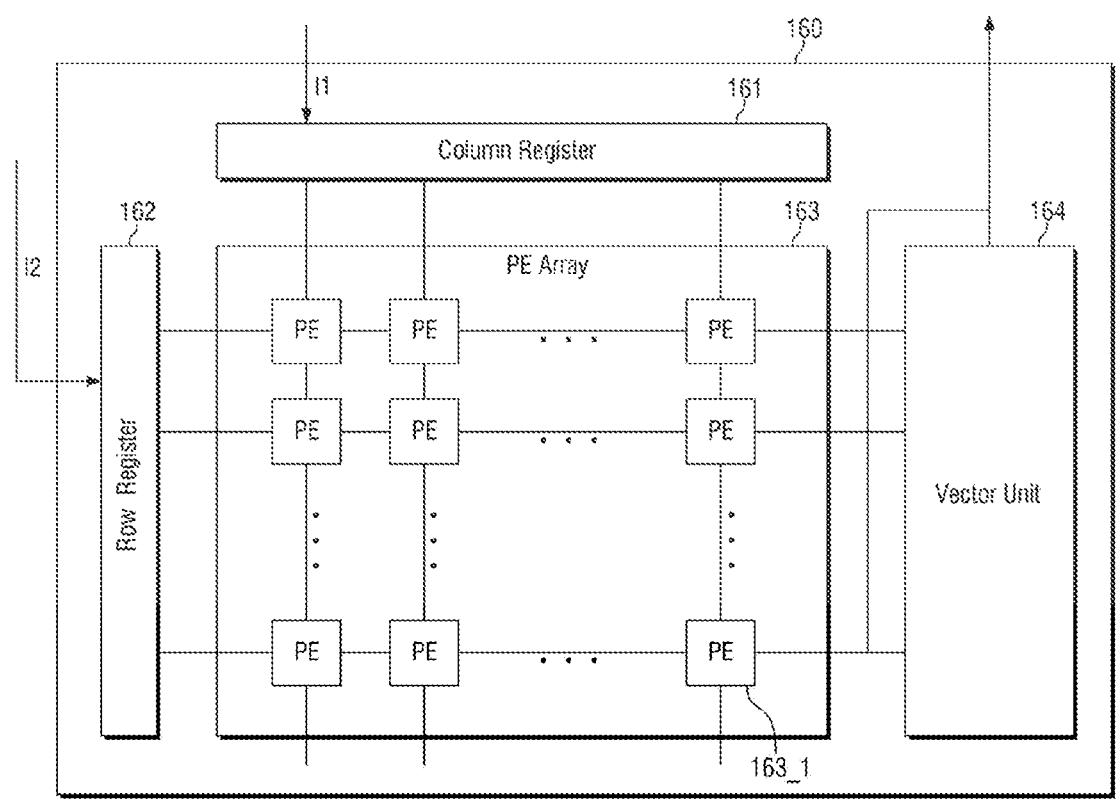
FIG. 10 is a block diagram provided to explain the processing unit of FIG. 8 in detail.

FIG. 10 is a block diagram provided to explain the processing unit of FIG. 8 in detail.

Referring to FIGS. 8 and 10, the processing unit 160 may include the PE array 163, the vector unit 164, a column register 161, and a row register 162.

The PE array 163 may receive the input activation (Act_In) and the weight (Weight) and perform multiplication. The input activation (Act_In) and the weight (Weight) may each be computed through convolution in matrix form. Through this, the PE array 163 may generate the output activation (Act_Out). However, aspects are not limited to the above. The PE array 163 may generate any type of output other than the output activation (Act_Out).

The PE array 163 may include at least one or more processing elements 163_1. The processing elements 163_1 may be aligned with one another and perform multiplication of one input activation (Act_In) and one weight (Weight), respectively.

The PE array 163 may generate a subtotal of the resultant values of each multiplication. The partial sum may be used as the output activation (Act_Out). The PE array 163 may also be called a two-dimensional matrix computing unit as it performs two-dimensional matrix multiplication.

The vector unit 164 may perform one-dimensional computation. The vector unit 164 may perform deep learning computation with the PE array 163. Through this, the processing unit 160 may be specialized for necessary computations. That is, the neural core 100 may include computation modules to perform a large amount of two-dimensional matrix multiplications and one-dimensional computations, and thus be able to perform the deep learning computation efficiently.

The column register 161 may receive a first input (I1). The column register 161 may receive the first input (I1), divide it, and provide the result to each column of the PE array 163.

The row register 162 may receive a second input (I2). The row register 162 may receive the second input (I2), divide the same, and provide the result to each row of the PE array 163.

A first input (I1) may be the input activation (Act_In) or the weight (Weight). The second input (I2) may be either the input activation (Act_In) or the weight (Weight), which is not the first input (I1). Alternatively, the first input (I1) and the second input (I2) may be values other than the input activation (Act_In) and the weight (Weight).

Figure 11:
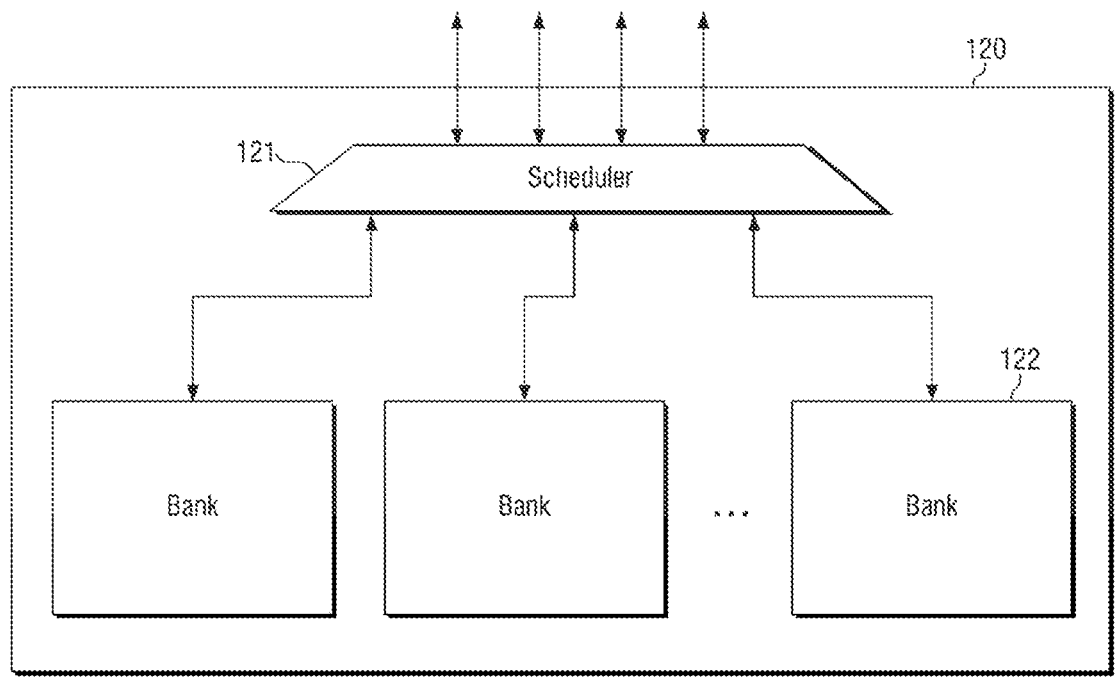
FIG. 11 is a block diagram provided to explain the L0 memory of FIG. 8 in detail.

FIG. 11 is a block diagram provided to explain the L0 memory of FIG. 8 in detail.

Referring to FIG. 11, the L0 memory 120 may include a scheduler 121 and at least one local memory bank 122.

When data is stored in the L0 memory 120, the scheduler 121 may receive the data from the load engine 113a. The data may be allocated to the local memory bank 122 in a round robin manner. Accordingly, the data may be stored in any one of at least one local memory bank 122.

Conversely, when the data is loaded from the L0 memory 120, the scheduler 121 may receive the data from the local memory bank 122 and transmit the same to the store engine 113b. The store engine 113b may store the data to the outside through the local interconnection 200.

Figure 12:
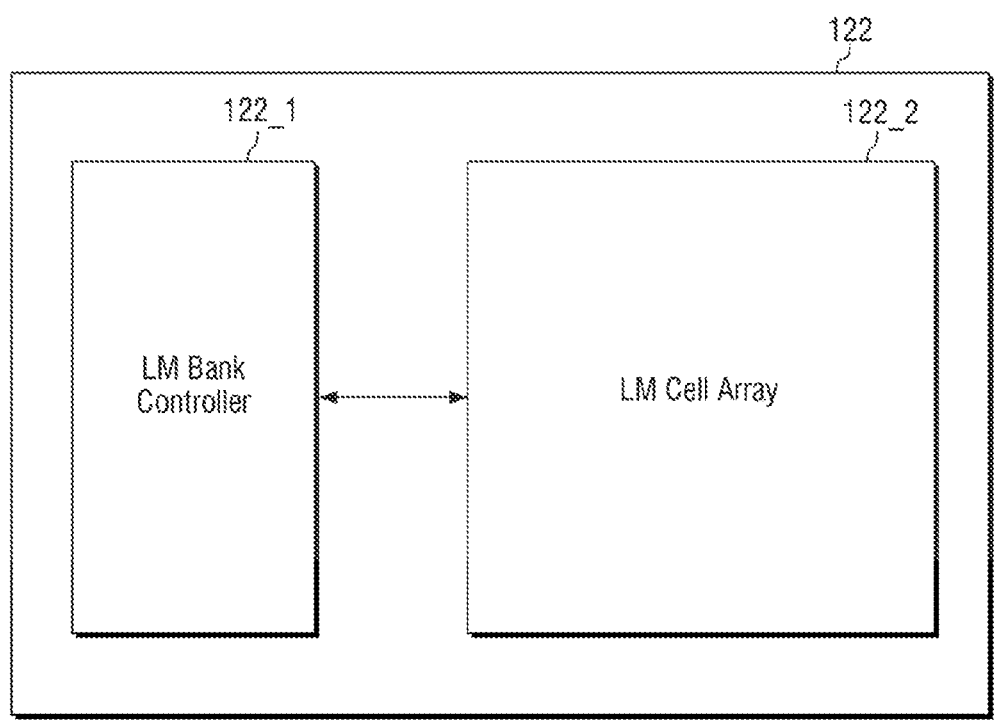
FIG. 12 is a block diagram provided to explain the local memory bank of FIG. 11 in detail.

FIG. 12 is a block diagram provided to explain the local memory bank of FIG. 11 in detail.

Referring to FIG. 12, the local memory bank 122 may include a local memory bank controller 122_1 and a local memory bank cell array 122_2.

The local memory bank controller 122_1 may manage read and write operations through address of data stored in the local memory bank 122. That is, the local memory bank controller 122_1 may manage the overall data input and output.

The local memory bank cell array 122_2 may have a structure in which cells directly stored with data are aligned in rows and columns. The local memory bank cell array 122_2 may be controlled by the local memory bank controller 122_1.

Figure 13:
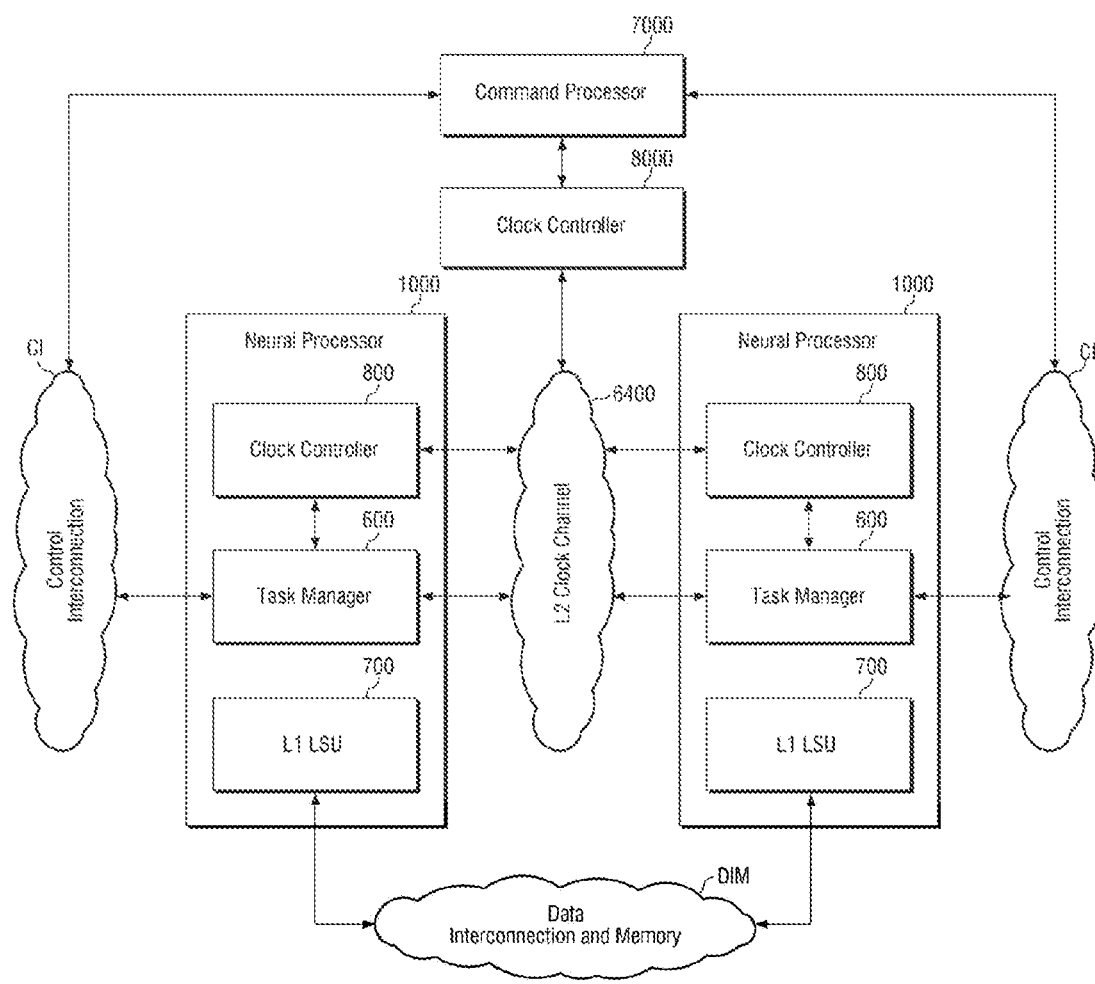
FIG. 13 is a block diagram provided to explain a flow of data, control signal, and clock signal of the neural processing device of FIG. 1.
Figure 14:
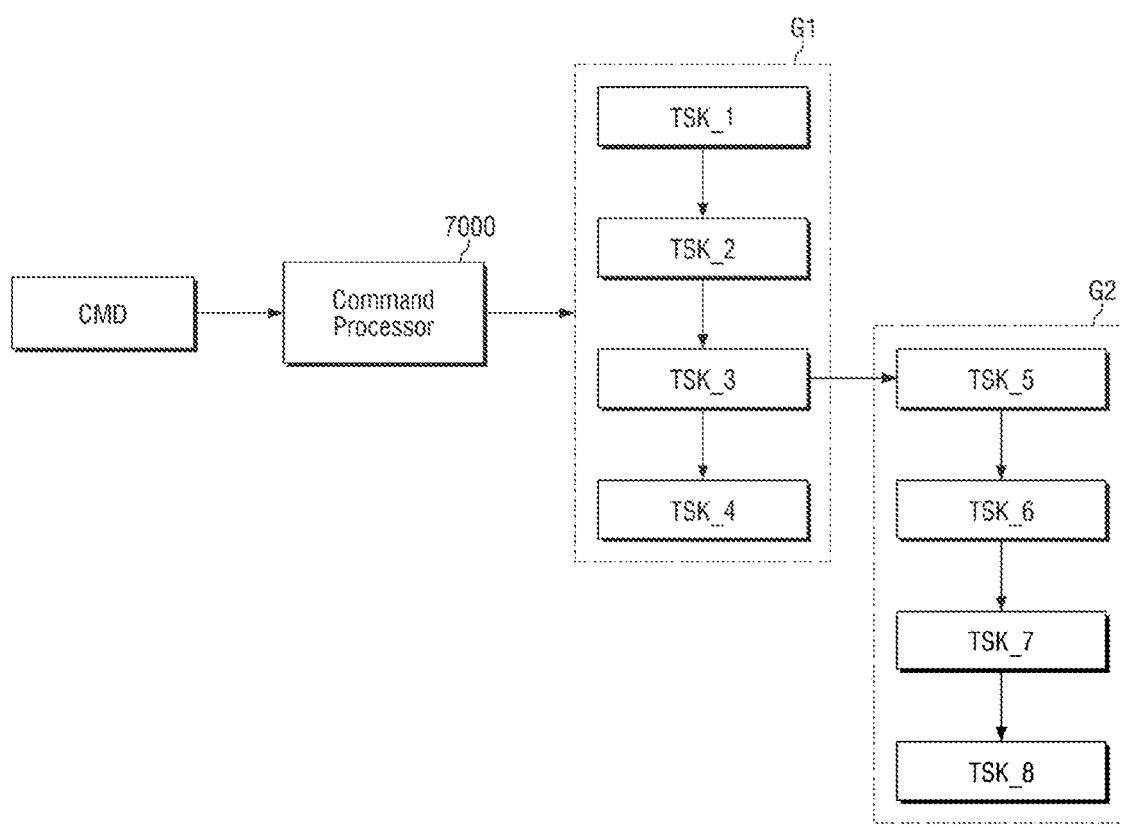
FIG. 14 is an exemplary diagram provided to explain a command processor defining a data flow architecture in response to a command.
Figure 15:
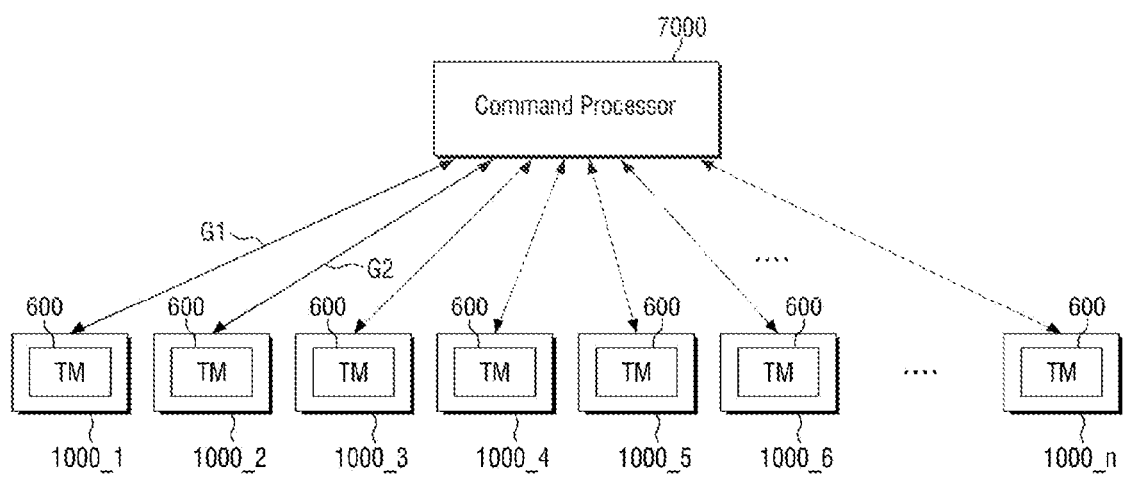
FIG. 15 is an exemplary diagram provided to explain patching of a task group performed by a command processor.
Figure 16:
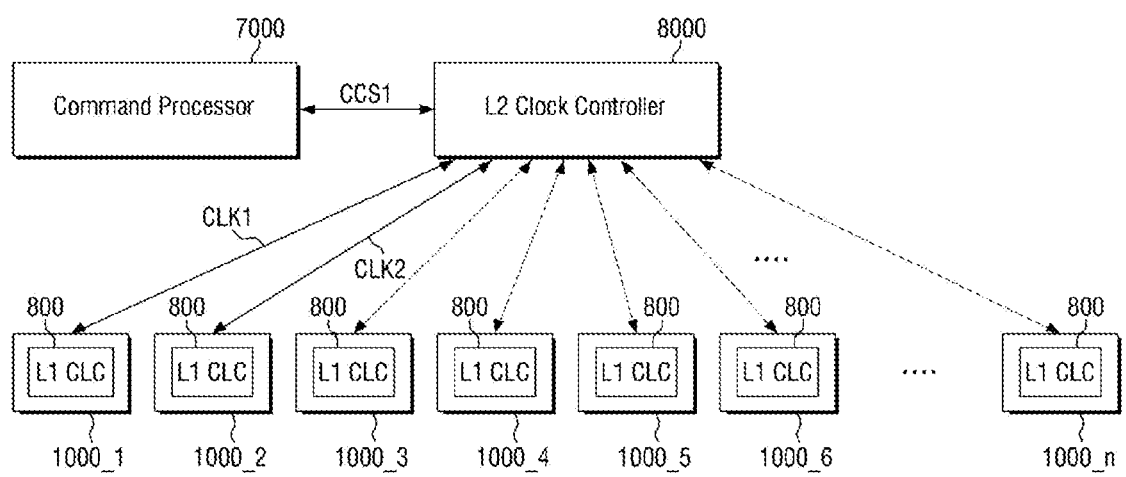
FIG. 16 is an exemplary diagram provided to explain clock gating performed on a neural processor in an L2 clock controller in response to patching of the task group according to FIG. 15.
Figure 17:
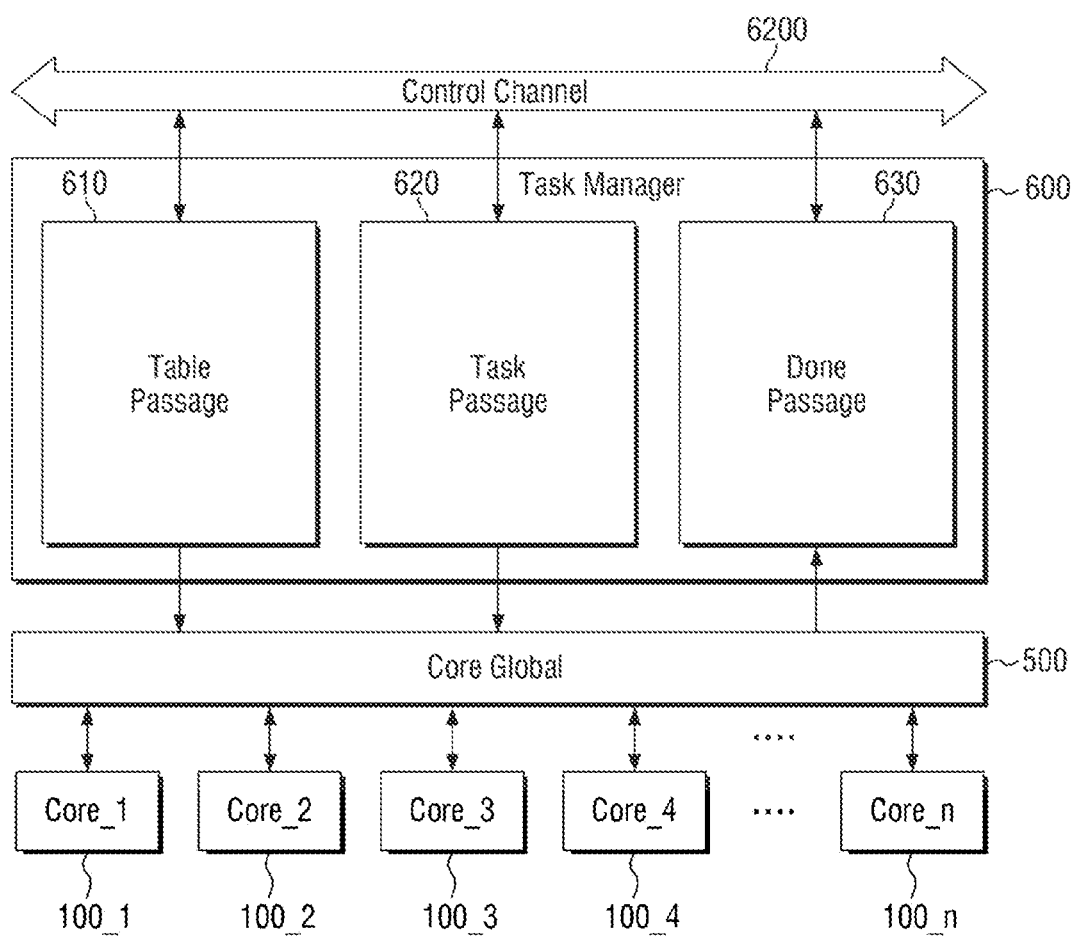
FIG. 17 is an exemplary diagram provided to explain a structure of the task manager in detail and also explain task distribution by the task manager.
Figure 18:
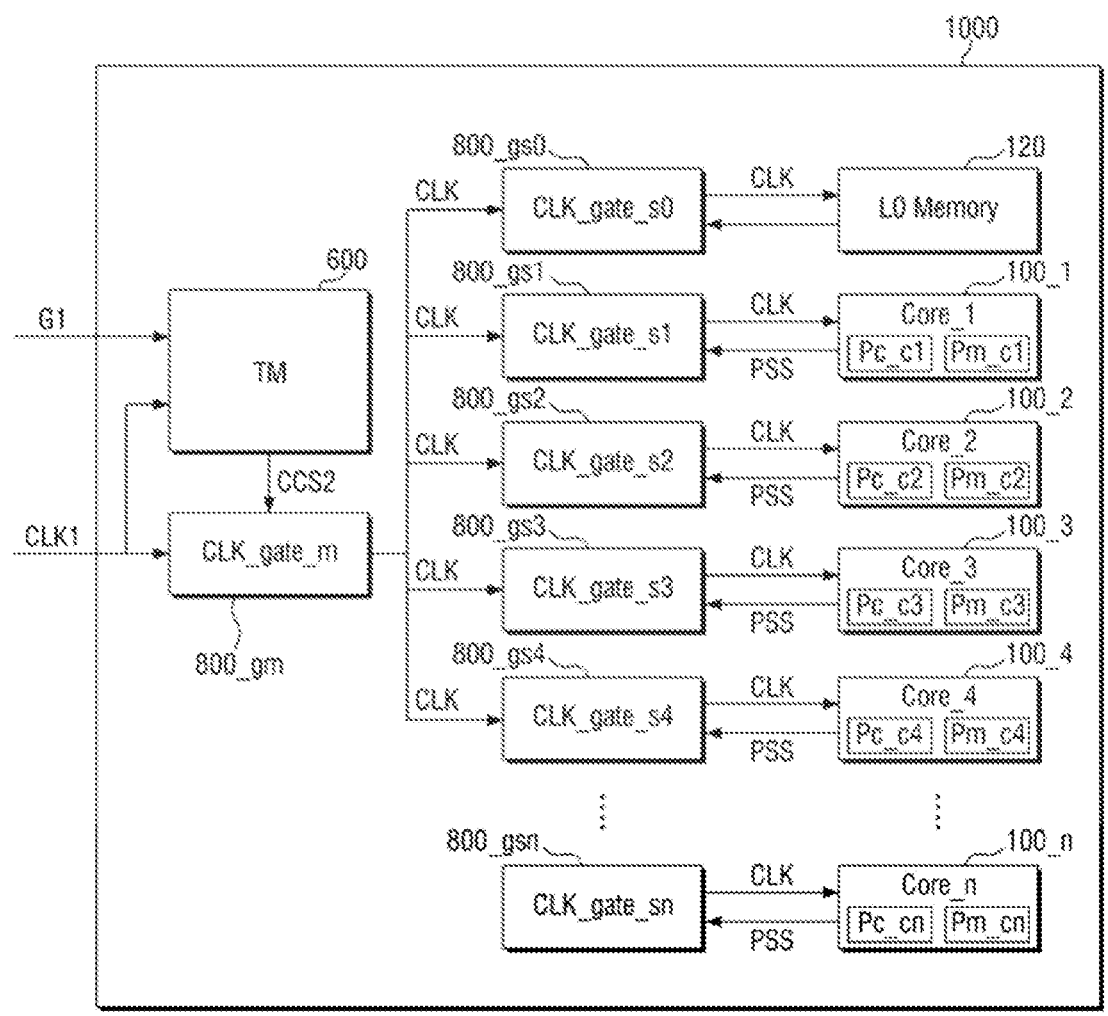
FIG. 18 illustrates a configuration of a neural processor that performs clock gating on a neural core.
Figure 19:
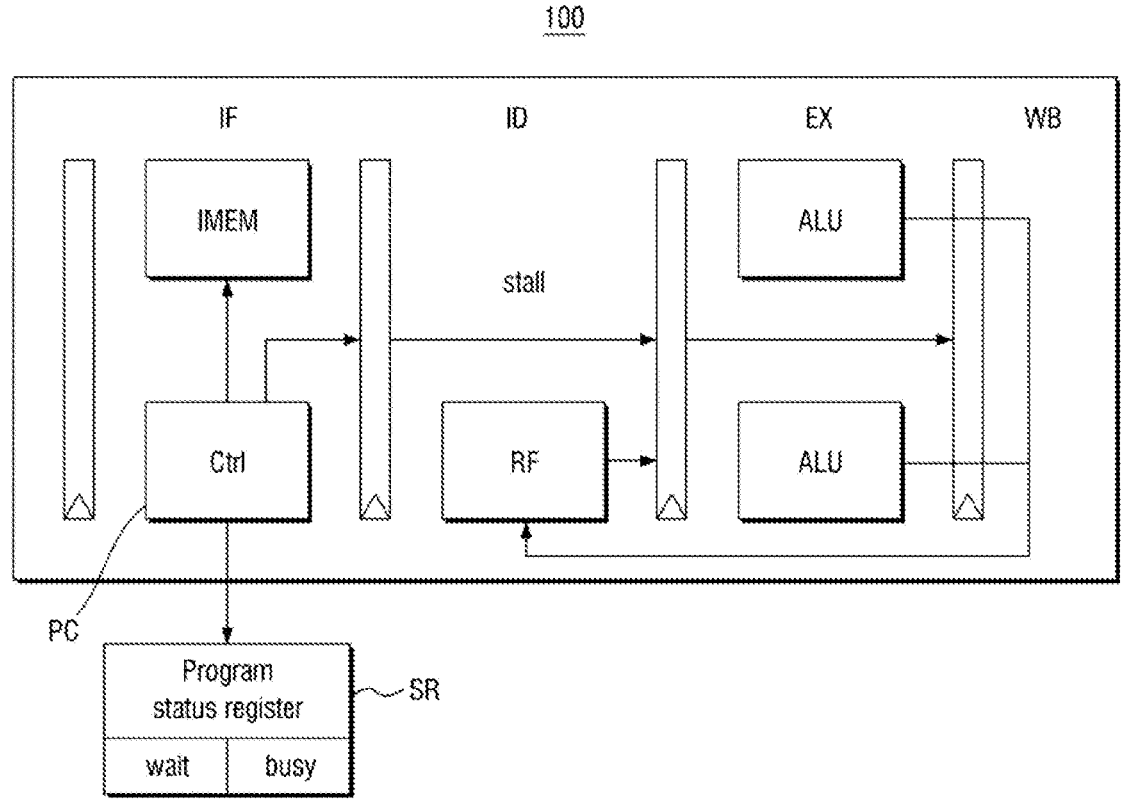
FIG. 19 schematically illustrates a logic in which an operation of one neural core is stalled according to the data flow architecture.
Figure 20:
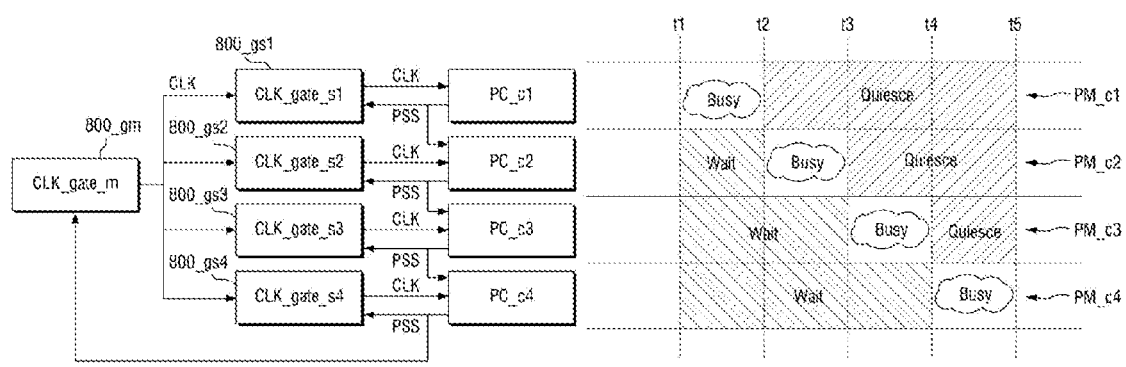
FIG. 20 is an exemplary diagram provided to explain a process of performing clock gating on a neural core.

FIG. 13 is a block diagram provided to explain a flow of data, control signal, and clock signal of the neural processing device of FIG. 1. FIG. 14 is an exemplary diagram provided to explain a command processor defining a data flow architecture in response to a command. FIG. 15 is an exemplary diagram provided to explain patching of a task group performed by a command processor. FIG. 16 is an exemplary diagram provided to explain clock gating performed by a neural processor in an L2 clock controller in response to patching of the task group according to FIG. 15. FIG. 17 is an exemplary diagram provided to explain a structure of the task manager in detail and also explain task distribution by the task manager. FIG. 18 illustrates a configuration of a neural processor that performs clock gating on a neural core. FIG. 19 schematically illustrates a logic in which an operation of one neural core is stalled according to the data flow architecture. FIG. 20 is an exemplary diagram provided to explain a process of performing clock gating on a neural core.

Referring to FIG. 13, each neural processor 1000 may include therein the task manager 600, the L1 LSU 700, and an L1 clock controller 800, respectively.

The task managers 600 of the neural processor 1000 may exchange a control signal and a response thereto with the command processor 7000 through the control interconnection CI. The L1 clock controllers 800 of the neural processor 1000 may exchange a clock signal and a corresponding response with the L2 clock controller 8000 through the L2 clock channel 6400.

The task manager 600 may be controlled by the command processor 7000. That is, the command processor 7000 may transmit a task to the task manager 600 through the control signals, and the task manager 600 may transmit a task completion report to the command processor 7000.

The L1 clock controller 800 may provide the clock signals required for the other components of the neural processor 1000 based on the clock signal provided from the L2 clock controller 8000. The L1 clock controller 800 may distribute the clock signals provided from the L2 clock controller 8000 to the other components of the neural processor 1000. The L1 clock controller 800 may serve as a clock gate for transmitting the clock signal to a configuration requiring distribution of the clock signal, but aspects are not limited thereto. In some aspects, the L1 clock controller 800 may change the operating frequency of the clock signal provided from the L2 clock controller 8000 to provide an operating clock signal required for the other components of the neural processor 1000.

At least one task manager 600 and the L1 clock controller 800 may be included in the neural processor 1000. Further, if there are a plurality of neural processors 1000, the number of task managers 600 may increase. All of the plurality of task managers 600 may be controlled by the command processor 7000.

The L1 LSU 700 may exchange data through the data interconnection and the memory (DIM). The data interconnection and the memory (DIM) may include an interconnection for transmitting data, and a memory for sharing the data. Specifically, the data interconnection and the memory (DIM) may include the local interconnection 200 and the data channel 6100. Further, the data interconnection and the memory (DIM) may include the L1 shared memory 400, the shared memory 2000, and the volatile memory 32. However, aspects are not limited to the above.

The command processor 7000 may divide and process the commands on the plurality of neural cores 100 in parallel, and perform each program, computation, etc. to produce the final result while data passes through the plurality of neural cores 100. In particular, the neural network has such a structure that, to operate a specific model, the specific model is divided into a plurality of program areas so as to be processed on one neural core 100 or a plurality of neural cores 100 in groups. The plurality of neural cores 100 may have a configuration in which a final result is produced as the input data passes through several neural cores, that is, a configuration in which the output of the preceding neural core is used as an input to the subsequent neural core.

The command processor 7000 may define a data flow architecture for performing a specific command. Defining the data flow architecture may at least include defining a plurality of tasks for executing a command, determining a dependency between the defined tasks, determining a plurality of neural cores to perform the plurality of tasks, and determining an execution order of the plurality of neural cores determined in consideration of the dependency. The task may be a processing unit performed in the neural core 100. The neural core 100 is a processing unit optimized for the deep learning computational work, and may correspond to one operation of the deep learning computational work. In addition, in the present disclosure, the neural core 100 is a sub-concept of the neural processor 1000, and determining the neural core 100 to process the task may include determining the neural processor 1000 that includes the neural core 100.

The data flow architecture may be interpreted as defining the information on a plurality of tasks, order of processing a plurality of tasks, flow of processing a plurality of tasks, a plurality of neural cores to process a plurality of tasks, order of operating a plurality of neural cores, and flow of operating a plurality of neural cores. In some aspects, the neural core may be provided with control information related to the task to be processed and information of the other neural cores defined together in the data flow architecture, so as to support the neural core operating according to the data flow architecture defined by the command processor 7000, with gating of the clock signal.

Referring to FIG. 14, the command processor 7000 may configure a data flow architecture for performing a command CMD. The command processor 7000 may be configured to sequentially or parallelly perform a plurality of tasks to process the command CMD in the plurality of neural cores 100. A plurality of tasks according to the defined data flow architecture may be processed in at least one neural processor 1000. The command processor 7000 may determine the neural processor 1000 to perform a plurality of tasks according to the defined data flow architecture, and may patch the task to the task manager 600 of the neural processor 1000 through the control channel 6200.

In some aspects, the command processor 7000 may define a plurality of task groups to process a plurality of tasks in parallel, and the data flow architecture may further include the information on the plurality of task groups.

If the data flow architecture includes the first task group and the second task group, the first task group may include at least one task, and the second task group may include at least one task branched from the task of the first task group. In some aspects, the command processor 7000 may distribute the first task group and the second task group to different neural processors 1000 for parallel processing of the first task group and the second task group.

For example, as illustrated in FIG. 14, in response to the command, the command processor 7000 may define first task TSK_1 to eighth task TSK_8 to perform the command CMD. In addition, the command processor 7000 may configure a data flow architecture that divides the defined tasks into a plurality of groups so that parallel processing is performed for efficient processing. In the example of FIG. 14, the first to fourth tasks TSK_1 to TSK_4 may be defined as a first task group G1, and the fifth to eighth tasks TSK_5 to TSK_8 may be defined as a second task group G2. The first to fourth tasks TSK_1 to TSK_4 of the first task group G1 may have dependencies on the preceding tasks. That is, the computational work for the second task TSK_2 may be performed only when the computational work for the first task TSK_1 is completed, and the first task TSK_1 to the fourth task TSK_4 may be sequentially processed. The fifth to eighth tasks TSK_5 to TSK_8 of the second task group G2 may have dependencies on the preceding tasks. That is, the computational work for the seventh task TSK_7 may be performed only when the computational work for the sixth task TSK_6 is completed, and the fifth task TSK_5 to the eighth task TSK_8 may be sequentially processed. In addition, the fifth task TSK_5 of the second task group G2 is a task having dependency on the third task TSK_3 of the first task group G1, and may be a task branched from the third task TSK_3.

The command processor 7000 may select at least one neural processor 1000 that performs the first to eighth tasks TSK_1 to TSK_8. In addition, the command processor 7000 may select at least one neural core 100 to perform each task in the selected neural processor 1000. The command processor 7000 may patch the first to eighth tasks TSK_1 to TSK_8 to the selected neural processor 1000. In some examples, the command processor 7000 may distribute the tasks defined for each task group to the neural processor 1000.

The distributed tasks are distributed to the designated neural core 100 according to the data flow architecture defined by the neural processor 1000 and sequentially processed. That is, at least one task included in the task group may be processed in consideration of dependency through a synchronization signal (Sync signal) in the distributed neural processor 1000.

The command processor 7000 may generate a first clock control signal CCS1 including at least information on the neural processor 1000 to which the task is distributed. That is, the command processor 7000 may configure the first clock control signal CCS1 according to the data flow architecture defining the neural processor 1000 to which the task is distributed, thereby controlling the L2 clock controller 8000. The L2 clock controller 8000 may selectively provide the clock signal in response to the first clock control signal CCS1 provided from the command processor 7000. That is, the L2 clock controller 8000 may selectively provide the clock signal to the neural processor 1000 according to the data flow architecture.

For example, referring to FIG. 15, the command processor 7000 may control the first to n-th neural processors 1000_1 to 1000_*n*. Where, n may be a natural number of 1 or more. A first neural processor 1000_1 may be selected as a neural processor for processing the first task group G1 including the first to fourth tasks TSK_1 to TSK_4, and a second neural processor 1000_2 may be selected as a neural processor for processing the second task group G2 including the fifth to eighth tasks TSK_5 to TSK_8.

The command processor 7000 may distribute tasks corresponding to the first task group G1 to the task manager 600 of the first neural processor 1000_1 through the control signal, and distribute tasks corresponding to the second task group G2 to the task manager 600 of the second neural processor 1000_2 through the control signal.

In some aspects, the command processor 7000 may configure a task descriptor corresponding to each task, which describes control information for the neural processor 1000 to process the first to eighth tasks TSK_1 to TSK_8 according to the data flow architecture. The command processor 7000 may configure the control information of the task descriptor with the information defined in relation to each task according to the data flow architecture and provide the configured control information to the neural processor 1000.

In addition, referring to FIG. 16, the command processor 7000 may provide the first clock control signal CCS1 including the neural processor information (the first and second neural processors) to which the tasks are distributed to the L2 clock controller 8000. That is, the first clock control signal CCS1 may include information that the first task group G1 is provided to the first neural processor 1000_1, and information that the second task group G2 is provided to the second neural processor 1000_2. The L2 clock controller 8000 may provide the first neural processor 1000_1 and the second neural processor 1000_2 with a first clock signal CLK1 and a second clock signal CLK2 for operation, respectively, and may perform clock gating for the remaining neural processors 1000_2 to 1000_*n*. That is, the L2 clock controller 8000 may selectively provide the clock signal to the L1 clock controller 800 of the first neural processor 1000_1 and the L1 clock controller 800 of the second neural processor 1000_2.

In some aspects, the first clock control signal CCS1 may further include timing information for distributing the tasks to the neural processor 1000, and the L2 clock controller 8000 may distribute the clock signals based on the timing information for distributing the tasks. That is, the timing information for distributing the tasks to each neural processor 1000 may be different from each other, and the L2 clock controller 8000 may transmit the clock signal for operation to the neural processor in response to the timing information included in the first clock control signal CCS1.

For example, according to the data architecture flow defined in FIG. 14, the second task group G2 may be operated after the processing of the third task TSK_3 of the first task group G1. Accordingly, the command processor 7000 may distribute the second task group G2 to the second neural processor 1000_2 after the time point at which the first task group G1 is distributed to the first neural processor 1000_1. The L2 clock controller 8000 may provide the clock signal to the neural processor 1000 according to a time point of distributing the task groups of the command processor 7000. That is, the L2 clock controller 8000 may be controlled to transmit the clock signal to the second neural processor 1000_2 after transmitting the clock signal to the first neural processor 1000_1.

In some examples, the time point at which the second task group G2 is distributed may be after the first task group G1 receives a completion signal for the third task TSK_3, but aspects are not limited thereto. In some aspects, the data architecture flow may include estimated processing time information of each task, and the time point at which the second task group G2 is distributed may be determined based on the estimated task processing time.

The task manager 600 of the neural processor 1000 may distribute at least one task provided from the command processor 7000 to at least one neural core 100 for processing. In some aspects, the task manager 600 may analyze the task descriptor provided from the command processor 7000 to support processing of the corresponding task according to the data architecture flow.

Referring to FIG. 17, the task manager 600 may include a table passage 610, a task passage 620, and a done passage 620.

The table passage 610 may receive, from the control channel 6200, a table update request for updating a matching table between a physical address and a logical address and transmit the received request to the core global 500. In this case, the table update request may be transmitted from the command processor 7000 through the control channel 6200.

The task passage 620 may receive a task from the control channel 6200, generate task information accordingly, and transmit the generated information to the core global 500. In this case, the task from the command processor 7000 may be transmitted through the control channel 6200. The task passage 620 may include a dependency check for checking dependency for the current task. The dependency check may check whether the preceding task for the provided task was performed, and transmit the task information completed with the dependency check to the core global 500.

The core global 500 may transmit the task information to the neural core 100. The neural core 100 may perform the task according to the transmitted task information, and may transmit a completion signal to the core global 500. The core global 500 may transmit the completion signal to the done passage 630.

The done passage 630 may receive the completion signal and generate a task completion report. The done passage 630 may transmit the completion report to the command processor 7000 through the control channel 6200. In addition, the done passage 630 may generate a dependency update request in response to the completion signal. In response to the dependency update request, information for checking the dependency of the task passage 620 may be updated.

In addition, the table update request of the table passage 610 may be transmitted to the neural core 100 through the core global 500. In this case, the table of the translation index buffer 114 in the LSU 110 of the neural core 100 may be updated.

In some aspects, tasks distributed to the neural core 100 through the task manager 600 may be in such a state that the information of the neural core for distribution, estimated processing time, and the like are predefined by the data flow architecture. The task manager 600 may check the dependency between the tasks defined by the data flow architecture provided from the command processor 7000, and provide the task completed with the dependency check to the neural core 100 through the core global 500. That is, the task manager 600 may manage the task processing at the neural core 100 corresponding to the task according to the execution order of the task defined according to the data flow architecture.

For example, the task manager 600 of FIGS. 17 and 18 is the task manager of the first neural processor 1000_1 provided with the first to fourth tasks TSK_1 to TSK_4 (i.e., the first task group G1) in FIG. 15, and may be provided with the first clock signal CLK1. The first neural processor 1000_1 may include the first to n-th neural cores 100_1 to 100_n.

The first to fourth tasks TSK_1 to TSK_4 may include dependency information of the first to fourth tasks according to the data flow architecture. The task manager 600 of FIG. 17 may check the dependency of the first to fourth tasks TSK_1 to TSK_4. Each of the first to fourth tasks TSK_1 to TSK_4 may be distributed to the first to n-th neural cores 100_1 to 100_n based on the dependency information.

Since the first to fourth tasks TSK_1 to TSK_4 have dependency on the preceding tasks, the second task TSK_2 may be distributed to the neural core 100 for processing after the first task TSK_1 is completed. Specifically, according to a dependency update request corresponding to the completion signal generated after the first task TSK_1 is processed, the dependency check information of the task passage 620 may be updated. According to the updated dependency check information, the dependency check of the second task TSK_2 is completed, and the distribution and processing of the second task TSK_2 are performed. According to the same method, the third task TSK_3 may be distributed after the second task TSK_2 is completed, and the fourth task TSK_4 may be distributed after the third task TSK_3 is completed, respectively.

The task manager 600 may distribute the first to fourth tasks TSK_1 to TSK_4 to the first to n-th neural cores 100_1 to 100_n, respectively. For example, the task manager 600 may distribute the first task TSK_1 to a first neural core 100_1, distribute the second task TSK_2 to a second neural core 100_2, distribute the third task TSK_3 to a third neural core 100_3, and distribute the fourth task TSK_4 to a fourth neural core 100_4.

The L1 clock controller 800 of the neural processor 1000 may selectively provide the clock signal in response to the task distributed by the task manager 600. In addition, the L1 clock controller 800 may selectively gate the clock signal in response to the task having been processed.

Referring to FIG. 18, the task manager 600 may generate a second clock control signal CCS2 and transmit the generated signal to the L1 clock controller 800. The second clock control signal CCS2 may include information on at least one neural core 100 to which the task is distributed. That is, the task manager 600 may configure the second clock control signal CCS2 according to the data flow architecture defining the neural core 100 to which the task is distributed, thereby controlling the L1 clock controller 800. In some aspects, the task manager 600 may always be in a state of receiving a clock signal and operating. When determining a need for the supply of clock signal to the neural core 100 or to other components that require the supply of clock signal, the task manager 600 may control the supply of clock signal through the L1 clock controller 800.

In response to the second clock control signal CCS2, the L1 clock controller 800 may selectively transmit the clock signal CLK to the at least one neural core 100. The L1 clock controller 800 may selectively provide the clock signal to the neural core 100 according to the data flow architecture.

For example, if the task manager 600 distributes the first to fourth tasks TSK_1 to TSK_4 to the first to fourth neural cores 100_1 to 100_4, respectively, the L1 clock controller 800 may selectively transmit the clock signal to the first to fourth neural cores 100_1 to 100_4, and may not transmit the clock signal to the other neural cores 100_5 to 100_n to which the task is not distributed.

In some aspects, the second clock control signal CCS2 may include timing information for distributing the tasks to the neural core 100. The first to fourth tasks TSK_1 to TSK_4 may be sequentially distributed to the first to fourth neural cores 100_1 to 100_4 according to the dependency between tasks. The L1 clock controller 800 may transmit the clock signal in response to the timing information for distributing the tasks to the first to fourth neural cores 100_1 to 100_4. For example, the second clock signal transmitted to the second neural core 100_2 processing the second task TSK_2 may be transmitted after the time point at which the first clock signal transmitted to the first neural core 100_1 processing the first task TSK_1 is transmitted. In some aspects, the second clock signal may be transmitted to the second neural core 100_2 at a time point when the processing for the first task TSK_1 is completed.

Referring to FIG. 18, in some aspects, the L1 clock controller 800 may include a master clock gate 800_gm that receives a second clock control signal CCS2 and a clock signal CLK provided from the L2 clock controller, and at least one slave clock gate 800_gs that receives a clock signal from the master clock gate 800_gm and selectively provides the clock signal to the corresponding neural core. The slave clock gate 800_gs may include first to n-th slave clock gates 800_gs1 to 800_gsn corresponding to the first to n-th neural cores 100_1 to 100_n, respectively. In addition, the slave clock gate 800_gs may further include a slave clock gate configured to provide a clock signal to the configurations of the neural processor 1000 other than the neural core.

The master clock gate 800_gm may control the clock signals transmitted to the first to n-th slave clock gates 800_gs 1 to 800_gsn in response to the second clock control signal CCS2. The first to n-th slave clock gates 800_gs1 to 800_gsn may control the clock signals transmitted to the corresponding first to n-th neural cores 100_1 to 100_n.

In some aspects, the master clock gate 800_gm may simultaneously transmit the clock signals to the first to n-th slave clock gates 800_gs1 to 800_gsn, and control the time point at which the clock signals are distributed from the first to n-th slave clock gates 800_gs1 to 800_gsn to the first to n-th neural cores 100_1 to 100_n. However, aspects are not limited thereto. In some aspects, the master clock gate 800_gm may differentially transmit the clock signal to the first to n-th slave clock gates 800_gs1 to 800_gsn in response to the time point at which the task is distributed to the first to n-th neural cores 100_1 to 100_n.

In some aspects, the slave clock gate 800_gs may gate the clock signal according to an operation state from the corresponding neural core 100. The slave clock gate 800_gs may receive an operation state signal PSS from the corresponding neural core 100 and provide the clock signal to the corresponding neural core 100 based on the operation state signal PSS. The slave clock gate 800_gs may provide the clock signal to the corresponding neural core 100 according to the operation state signal PSS. The operation state signal PSS may be a signal indicating the current state of the neural core.

In some aspects, the neural core 100 may include a processing module (PM) that performs computation, and an operation controller (PC) that identifies the operation state of the processing module (PM) based on the data flow architecture. That is, the first to n-th neural cores 100_1 to 100_n include first to n-th processing modules PM_c1 to PM_cn, respectively, and may include first to n-th operation controllers PC_c1 to PC_cn, respectively.

The processing module (PM) may be considered as the processing unit 160 in certain examples, although aspects are not limited thereto. In some aspects, the processing module (PM) may be defined as a concept including the load/store unit (LSU) 110, the L0 memory 120, the weight buffer 130, the activation LSU 140, the activation buffer 150, and the processing unit 160.

The operation controller (PC) may be configured to sense the operation state of the processing module (PM) and generate an operation state signal PSS, and transmit the operation state signal PSS to the corresponding slave clock gate 800_gs. The operation controller (PC) may be configured such that the clock signal is always supplied to sense the operation state of the processing module (PM). That is, the operation controller (PC) is in always-on state.

The neural core 100 may include a processing module (PM) in which the clock signal is selectively gated, and an operation controller (PC) that is always provided with the clock signal and operated. The operation controller (PC) may be referred to as an operation controller circuit or the like, but will be referred to as the operation controller for convenience. In addition, the operation controller (PC) may be implemented as a circuit (or circuitry). However, aspects are not limited thereto, and the operation controller (PC) may be implemented in software on a memory, and may be implemented in software and partly with hardware elements.

The operation controller (PC) may identify the operation state of the corresponding processing module (PM) based on the data flow architecture, and may generate an operation state signal according to the identified operation state.

In some aspects, the operation state signal PSS may indicate an operation state of the processing module (PM). The operation state signal PSS may indicate busy, wait, or quiesce state of the processing module (PM). The busy state corresponds to a state in which the processing module (PM) is currently performing a computation, that is, in an operation state. The wait state refers to a state in which the processing module (PM) is waiting for the start of the execution of a task according to the data flow architecture. The quiesce state may refer to a state in which the processing module (PM) has completed the computation for the task and ended the computation. The slave clock gate 800_gs may gate the clock signal provided to the processing module (PM), if the state of the corresponding processing module (PM) is wait or quiesce state.

The operation controller (PC) may determine whether the operation of the preceding neural core 100 for the operation of the corresponding processing module (PM) is completed. That is, the operation controller (PC) may identify the data flow architecture based on whether the preceding neural core 100 is completed or not. The processing module (PM) may generate a task completion signal when the computation is ended. The task completion signal generated by the neural core 100 may be transmitted to the subsequent neural core 100 according to the preset data flow architecture. The subsequent neural core 100 may wait until the completion signal from the preceding neural core 100 is received, and the clock signal to the processing module (PM) may be gated in response.

FIG. 19 schematically illustrates a logic in which the operation of one neural core 100 is stalled according to the data flow architecture. The operation controller (PC) is configured to check the state of a program state register (SR) and may process the operation to be stalled according to the state of the program state register (SR). The program state register (SR) may be configured to transition between states according to a completion signal from the preceding neural core 100 defined in accordance with the data flow architecture.

If the completion signal from the preceding neural core 100 is not received, the process of instruction (IF), interpretation (ID), execution (EX), and writing (WB) of the arithmetic logic unit (ALU) by the operation controller (PC) is controlled such that the operation is stalled according to the state of the program state register (SR). Accordingly, the operation state signal PSS is continuously determined to be in the wait state, and the clock signal to the corresponding processing module (PM) may be gated. The state of the program state register (SR) may be changed from wait to busy state by the completion signal provided upon completion of the operation or computation of the preceding neural core. Accordingly, the operation state signal PSS output from the operation controller (PC) may also be changed to busy state, and the clock signal is provided to the processing module (PM).

In some aspects, the operation state signal PSS may be transmitted to the corresponding slave clock gate 800_gs according to a predetermined period, but aspects are not limited thereto. In some aspects, the operation state signal PSS may be provided to the slave clock gate 800_gs in response to event conditions associated with the processing module (PM), e.g., in response to a completion signal indicating the end of a computation performed in the neural core 100.

Referring to the example of FIG. 20, the first to fourth tasks TSK_1 to TSK_4 may have sequential dependencies according to the data flow architecture, and the first to fourth neural cores 100_1 to 100_4 may be set such that the first to fourth tasks TSK_1 to TSK_4 are distributed and processed, respectively. That is, after the processing of the first task TSK_1 is performed in the first neural core 100_1, the processing of the second task TSK_2 is performed in the second neural core 100_2. After the processing of the second task TSK_2, the third task TSK_3 and the fourth task TSK_4 are performed sequentially in the second to fourth neural cores 100_2 to 100_3, respectively.

In the example of FIG. 20, the master clock gate 800_gm may provide the clock signals to the first to fourth slave clock gates 800_gs1 to 800_gs4 corresponding to the first to fourth neural cores 100_1 to 100_4. The first to fourth slave clock gates 800_gs1 to 800_gs4 may provide the clock signals required for the operation of the corresponding first to fourth neural cores 100_1 to 100_4. Further, the first to fourth slave clock gates 800_gs1 to 800_gs4 may selectively gate and provide the clock signals according to the current state of the corresponding first to fourth neural cores 100_1 to 100_4.

At a first time point t1, the first neural core 100_1 may receive a first task TSK_1 and perform a computation for the same. At a second time point t2, after the processing (Busy) of the first task TSK_1 is completed, the first operation controller PC_c1 of the first neural core 100_1 may transmit an operation state signal PSS according to the operation state of the first processing module PM_c1 to the first slave clock gate 800_gs1. The operation state signal PSS may be a completion signal indicating that the computation of the first processing module PM_c1 for the first task TSK_1 is completed and that the operation is in quiesce state. The first slave clock gate 800_gs1 may cut off or gate the clock signal provided to the first neural core 100_1 in response to the operation state signal PSS.

The operation state signal (i.e., completion signal of the first task TSK_1) provided from the first neural core 100_1 may be provided to the done passage of the task manager 600 via the core global 500, and a dependency update request may be generated in response to the completion signal. In response to the generated dependency update request, the dependency check information may be updated, and the dependency for the second task TSK_2 may be checked and the second task TSK_2 may be distributed to the second neural core 100_2. Further, the operation state signal PSS provided from the first neural core 100_1 may correspond to a synchronization signal and may be transmitted to the second neural core 100_2 via the L2 sync channel 6300. The transmission of the completion signal is performed according to a preset data architecture flow.

The state of the second neural core 100_2 may be changed from wait to busy state in response to the operation state signal PSS of the first neural core 100_1, i.e., in response to the completion signal. In response to this state change, the second operation controller PC_c2 of the second neural core 100_2 may transmit the operation state signal PSS to the second slave clock gate 800_gs2. From the first time point t1 to the second time point t2, that is, while waiting for the second task TSK_2, the operation state signal PSS of the second neural core 100_2 may be in the wait state. The second slave clock gate 800_gs2 may gate the clock signal to the second neural core 100_2 in response to the operation state signal PSS corresponding to the wait state. At the second time point t2, the second task TSK_2 may be distributed to the second neural core 100_2, and the second slave clock gate 800_gs2 may provide the clock signal to the second neural core 100_2. In addition, in some aspects, the second slave clock gate 800_gs2 may provide the clock signal to the second neural core 100_2 in response to the operation state signal PSS provided from the second operation controller PC_c2 of the second neural core 100_2.

The second neural core 100_2 performs a computation for the second task TSK_2. The second operation controller PC_c2 of the second neural core 100_2 may transmit the operation state signal PSS to the second slave clock gate 800_gs2 after the processing (Busy) of the second task TSK_2 is completed at a third time point t3. The operation state signal PSS may be a completion signal indicating that the computation of the second neural core 100_2 for the second task TSK_2 is completed and that the operation is in quiesce state. The second slave clock gate 800_gs2 may cut off or gate the clock signal provided to the second neural core 100_2, in response to the operation state signal PSS, i.e., in response to the completion signal of the second task TSK_2. Further, the operation state signal PSS provided from the second neural core 100_2 may correspond to a synchronization signal and may be transmitted to the third neural core 100_3 via the L2 sync channel 6300.

The state of the third neural core 100_3 may be changed from wait to busy state in response to the operation state signal PSS of the second neural core 100_2, i.e., in response to the completion signal. In response to this state change, the third operation controller PC_c3 of the third neural core 100_3 may transmit the operation state signal PSS to the third slave clock gate 800_gs3. From the first time point t1 to the third time point t3, that is, while waiting for the third task TSK_3, the operation state signal PSS of the third neural core 100_3 may be in the wait state. The third slave clock gate 800_gs3 may gate the clock signal to the third neural core 100_3 in response to the operation state signal PSS corresponding to the wait state. At the third time point t3, the third task TSK_3 may be distributed to the third neural core 100_3, and the third slave clock gate 800_gs3 may provide the clock signal to the third neural core 100_3. In addition, in some aspects, the third slave clock gate 800_gs3 may provide the clock signal to the third neural core 100_3 in response to the operation state signal PSS provided from the third operation controller PC_c3 of the third neural core 100_3.

The third neural core 100_3 performs a computation for the third task TSK_3. The third operation controller PC_c3 of the third neural core 100_3 may transmit the operation state signal PSS to the third slave clock gate 800_gs3 after the processing (Busy) of the third task TSK_3 is completed at a fourth time point t4. The operation state signal PSS may be a completion signal indicating that the computation of the third neural core 100_3 for the third task TSK_3 is completed and that the operation is in quiesce state. The third slave clock gate 800_gs3 may cut off or gate the clock signal provided to the third neural core 100_3, in response to the operation state signal PSS, i.e., in response to the completion signal of the third task TSK_3. Further, the operation state signal PSS provided from the third neural core 100_3 may correspond to a synchronization signal and may be transmitted to the fourth neural core 100_4 via the L2 sync channel 6300. The state of the fourth neural core 100_4 may be changed from wait to busy state in response to the operation state signal PSS of the third neural core 100_3, i.e., in response to the completion signal. In response to this state change, the fourth operation controller PC_c4 of the fourth neural core 100_4 may transmit the operation state signal PSS to the fourth slave clock gate 800_gs4. From the first time point t1 to the fourth time point t4, that is, while waiting for the fourth task TSK_4, the operation state signal PSS of the fourth neural core 100_4 may be in the wait state. The fourth slave clock gate 800_gs4 may gate the clock signal to the fourth neural core 100_4 in response to the operation state signal PSS corresponding to the wait state. At the fourth time point t4, the fourth task TSK_4 may be distributed to the fourth neural core 100_4, and the fourth slave clock gate 800_gs4 may provide the clock signal to the fourth neural core 100_4. In addition, in some aspects, the fourth slave clock gate 800_gs4 may provide the clock signal to the fourth neural core 100_4 in response to the operation state signal PSS provided from the fourth operation controller PC_c4 of the fourth neural core 100_4.

The fourth neural core 100_4 performs a computation for the fourth task TSK_4. The fourth neural core 100_4 may transmit the operation state signal PSS to the fourth slave clock gate 800_gs4 after the processing (Busy) of the fourth task TSK_4 is completed at a fifth time point t5. The operation state signal PSS may be a completion signal indicating that the computation of the fourth neural core 100_4 for the fourth task TSK_4 is completed and that the operation is in quiesce state. The fourth slave clock gate 800_gs4 may cut off or gate the clock signal provided to the fourth neural core 100_4, in response to the operation state signal PSS, i.e., in response to the completion signal of the fourth task TSK_4.

In some aspects, if the processing for the last one of a plurality of tasks defined according to the data flow architecture is completed, overall clock gating for at least one neural core 100 provided with the plurality of tasks may be performed. Specifically, if the processing for the last one of the plurality of tasks defined according to the data flow architecture is completed, the master clock gate 800_gm may cut off providing a clock signal to the slave clock gate corresponding to the at least one neural core 100 provided with the plurality of tasks.

In some aspects, the fourth neural core 100_4 may provide the operation state signal PSS, that is, the completion signal of the fourth task TSK_4 to the master clock gate 800_gm at the fifth time point t5. The master clock gate 800_gm may gate the clock signals provided to the first to fourth neural cores 100_1 to 100_4 in response to the completion signal of the fourth task TSK_4. That is, if the processing for the last one, i.e., the fourth task TSK_4 of the first to fourth tasks TSK_1 to TSK_4 defined according to the data flow architecture is confirmed, the master clock gate 800_gm may gate the clock signals provided to the first to fourth slave clock gates 800_gs1 to 800_gs4.

The neural processor and the neural processing device are configured to selectively provide the clock signal to the neural processor to which the task group is distributed, and to selectively provide the clock signal to the neural core to which the task is distributed, thereby effectively managing the clock power of the neural processing device.

Further, the neural processor and the neural processing device according to aspects of the present disclosure may be configured to selectively gate the clock signal when the operation of the neural core is completed, thereby further reducing power consumption of the neural processing device.

In the aspects and drawings described above, it is illustrated that a single command processor 7000 manages all of the neural processors 1000, i.e., the task managers 600, but aspects are not limited thereto. That is, as the number of task managers 600 increases, it may be difficult for the command processor 7000 to manage all of the task managers 600, and in order to improve this, the plurality of task managers 600 may be controlled and configured in a hierarchical structure.

Figure 21:
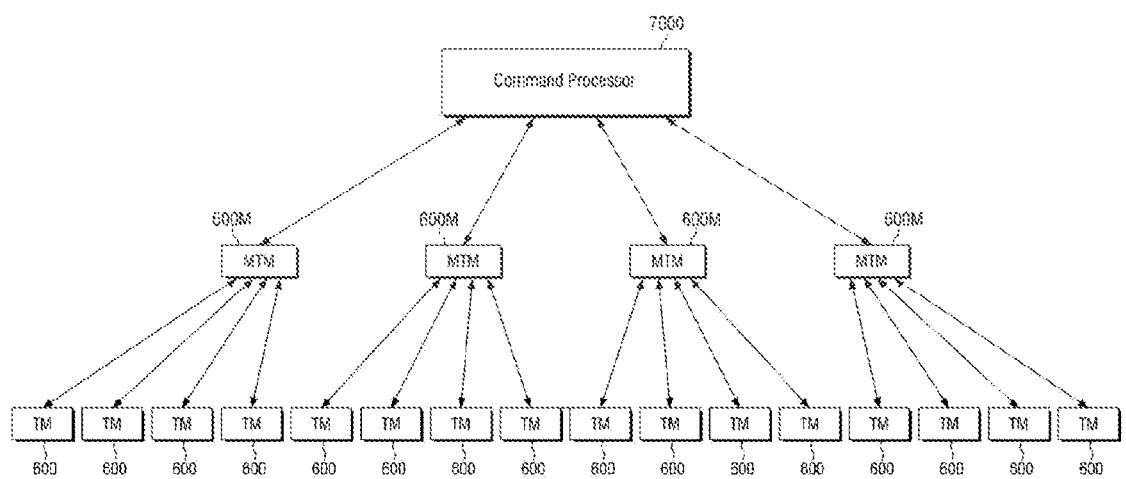
FIGS. 21 and 22 are diagrams provided to explain the hierarchical structure of the command processor and the task manager of the neural processing device.
Figure 22:
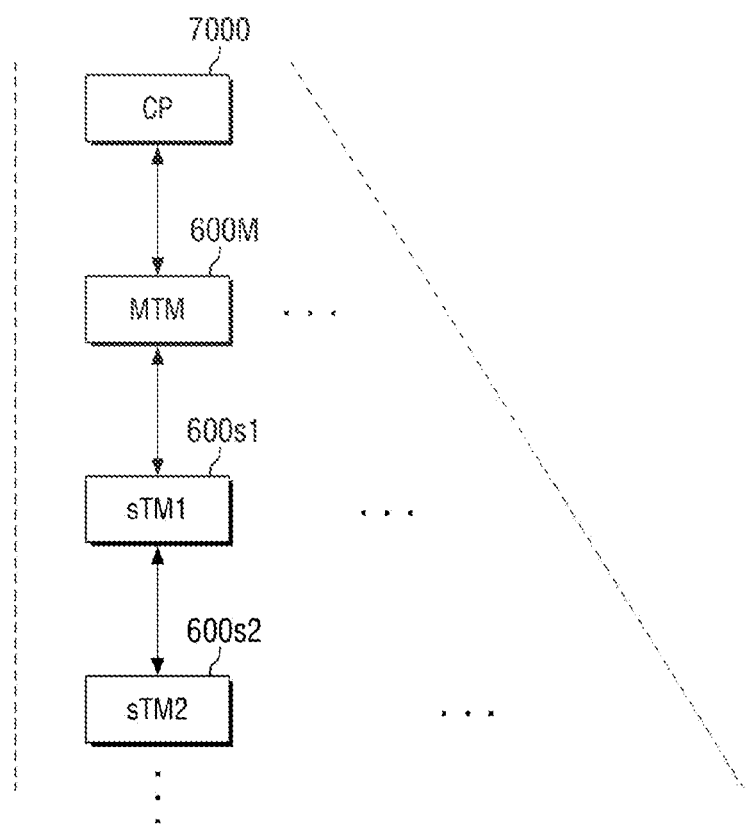

FIGS. 21 and 22 are diagrams provided to explain the hierarchical structure of the command processor and the task managers of the neural processing device according to some aspects of the present disclosure.

Referring to FIG. 21, in some aspects, the neural processing device 1 according to some aspects may have hierarchical structure in which a master task manager 600M manages the plurality of task managers 600, and the command processor 7000 manages the master task manager 600M.

In addition, referring to FIG. 22, levels below the master task manager 600M may also be subdivided in various ways. For example, a first sub-task manager 600s1 and a second sub-task manager 600s2 may form respective classes. That is, one first sub-task manager 600s1 may manage at least one second sub-task manager 600s2, and one master task manager 600M may manage at least one first sub-task manager 600s1. Further, several classes may be added below the second sub-task manager 600s2.

That is, although three levels of the task manager 600, the master task manager 600M, and the command processor 7000 are illustrated in FIGS. 21 and 22, the number of levels may be four or more. That is, depth of the hierarchical structure may vary depending on the number of task managers 600.

The hierarchical structure between the command processor 7000 and the plurality of task managers 600 may also apply to the corresponding L2 clock controller 8000 and L1 clock controllers 800. That is, as the number of L1 clock controllers 800 increases, it may be difficult for the L2 clock controller 8000 to manage all of the L1 clock controllers 800, and in order to improve this, the plurality of L1 clock controllers 800 may be controlled and configured in a hierarchical structure.

Figure 23:
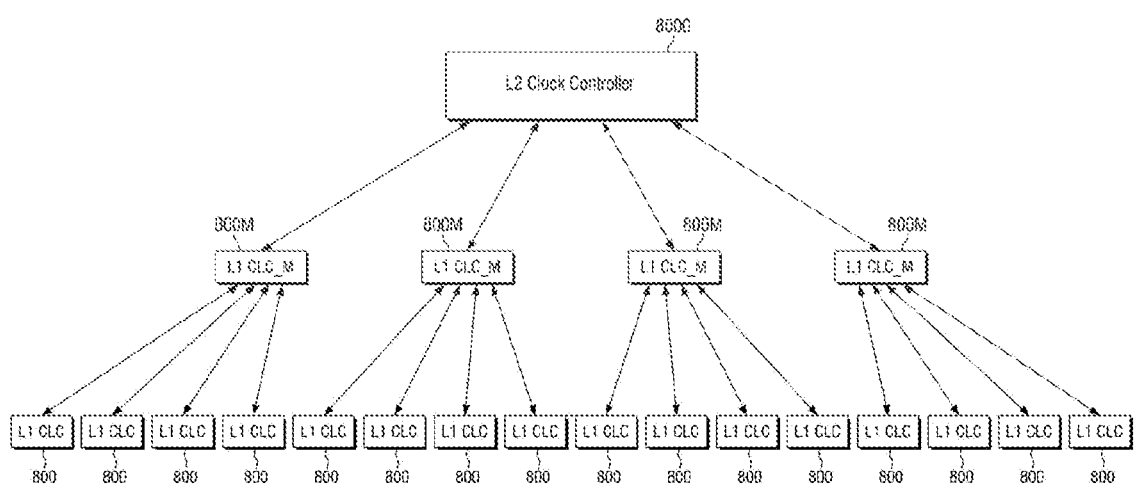
FIGS. 23 and 24 are diagrams provided to explain a hierarchical structure of an L2 clock controller and an L1 clock controller of a neural processing device.

FIGS. 23 and 23 are diagrams provided to explain the hierarchical structure of the L2 clock controller and the L1 clock controller of the neural processing device according to some aspects of the present disclosure.

Referring to FIG. 23, the neural processing device 1 according to some aspects may have a hierarchical structure in which a master L1 clock controller 800M manages the plurality of L1 clock controllers 800, and the L2 clock controller 8000 manages the master L1 clock controller 800M.

Figure 24:
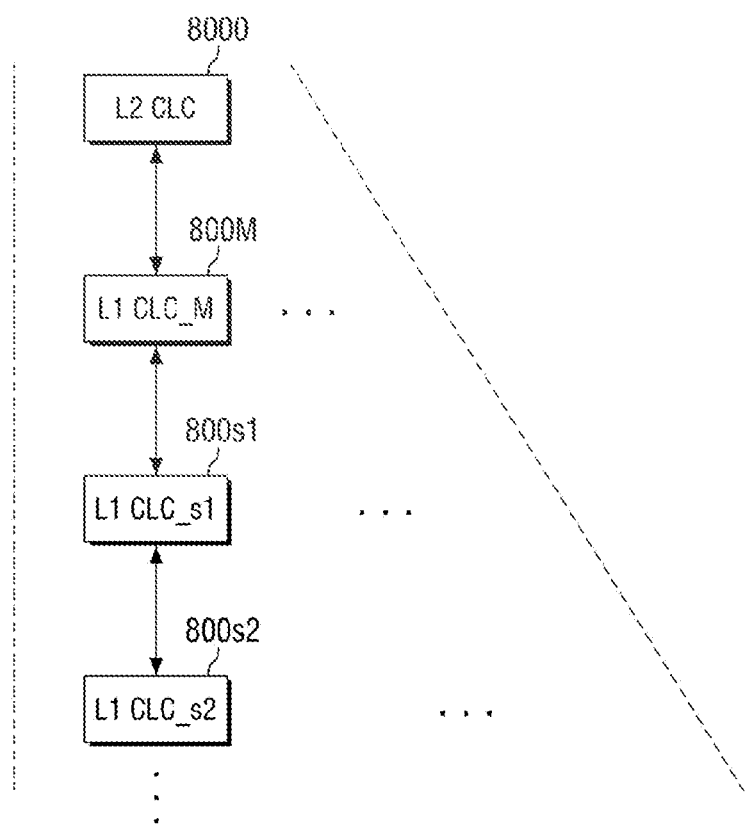

In addition, referring to FIG. 24, the levels below the master L1 clock controller 800M may also be subdivided into a plurality of types. For example, a first sub-L1 clock controller 800s1 and a second sub-L1 clock controller 800s2 may each form a hierarchical structure. That is, one first sub-L1 clock controller 800s1 may manage at least one second sub-L1 clock controller 800s2, and one master L1 clock controller 800M may manage at least one first sub-L1 clock controller 800s1. Additionally, multiple tiers may be added below the second sub-L1 clock controller 800s2.

Figure 25:
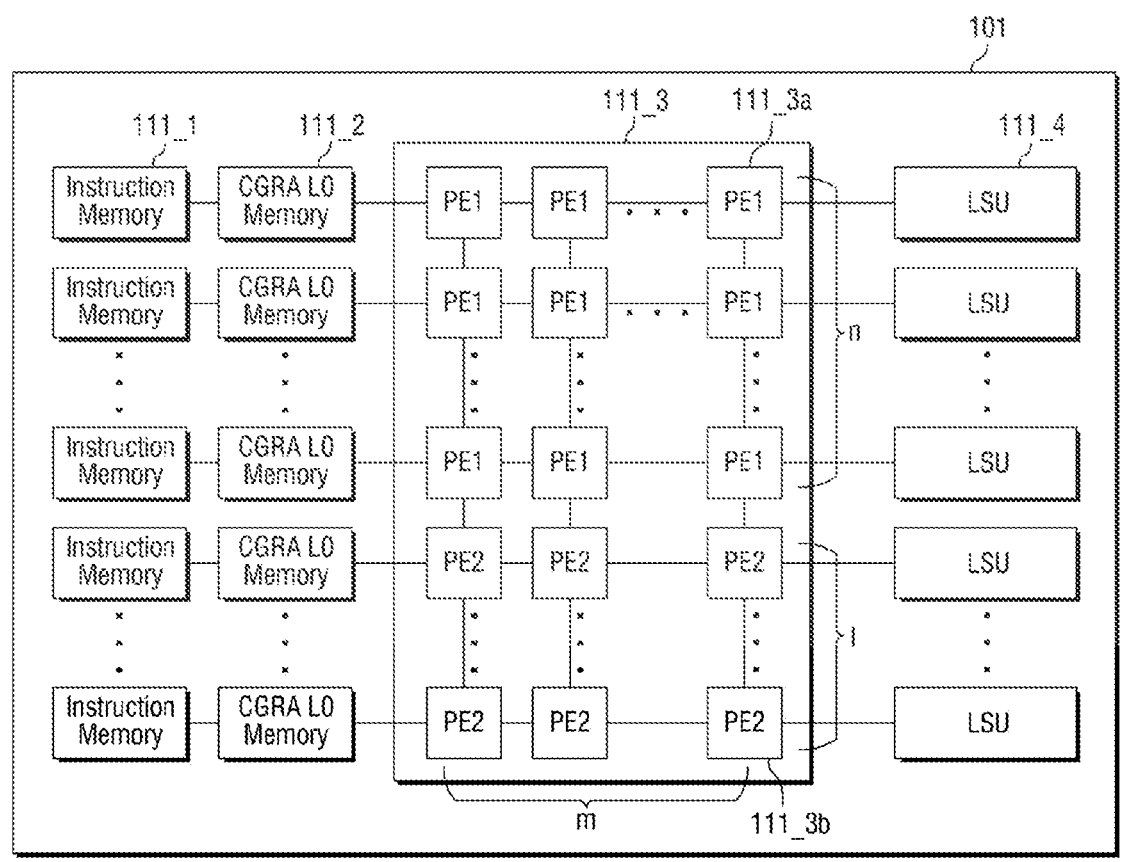
FIG. 25 is a block diagram provided to explain in detail the structure of the neural processing device.

FIG. 25 is a block diagram provided to explain in detail the structure of the neural processing device.

Referring to FIG. 25, unlike the neural core 100, a neural core 101 may have a CGRA structure. The neural core 101 may include an instruction memory 111_1, a CGRA L0 memory 111_2, a PE array 111_3, and a load/store unit (LSU) 111_4.

The instruction memory 111_1 may receive and store instructions. The instruction memory 111_1 may sequentially store the instructions therein and provide the stored instructions to the PE array 111_3. The instruction may instruct the operation of a first type processing element 111_3a included in each PE array 111_3.

The CGRA L0 memory 111_2 may be a memory located within the neural core 101, and the neural core 101 may receive all of input data required for the work from the outside and temporarily store the same in the CGRA L0 memory 111_2. In addition, the CGRA L0 memory 111_2 may temporarily store the output data computed by the neural core 101 so as to transmit the same to the outside. The CGRA L0 memory 111_2 may play a role of a cache memory of the neural core 101.

The CGRA L0 memory 111_2 may transmit and receive data to and from the PE array 111_3. The CGRA L0 memory 111_2 may be a memory corresponding to level 0 (L0) lower than L1. The L0 memory may be a private memory of the neural core 101 which is not shared. The CGRA L0 memory 111_2 may transmit data and programs such as activation or weight to the PE array 111_3.

The PE array 111_3 may be a module that performs computations. The PE array 111_3 may perform not only the one-dimensional computations but also the two-, or higher-dimensional matrix/tensor computations. The PE array 111_3 may include a plurality of first type processing elements 111_3a and second type processing elements 111_3b therein.

The first type processing elements 111_3a and the second type processing elements 111_3b may be aligned in rows and columns. The first type processing elements 111_3a and the second type processing elements 111_3b may be aligned in m columns. Further, the first type processing elements 111_3a may be aligned in n rows, and the second type processing elements 111_3b may be aligned in 1 rows. Accordingly, the first type processing elements 111_3a and the second type processing elements 111_3b may be aligned in (n+1) rows and m columns.

The LSU 111_4 may receive at least one of data, control signals, and synchronization signals from the outside through the local interconnection 200. The LSU 111_4 may transmit at least one of the data, the control signals, and the synchronization signals received by the CGRA L0 memory 111_2. Similarly, the LSU 111_4 may transmit at least one of the data, the control signals, and the synchronization signals to the outside through the local interconnection 200.

The neural core 101 may have a Coarse Grained Reconfigurable Architecture (CGRA) structure. Accordingly, for the neural core 101, each of the first type processing elements 111_3a and the second type processing elements 111_3b of the PE array 111_3 may be connected to at least one of the CGRA L0 memory 111_2, the instruction memory 111_1, and the LSU 111_4, respectively. That is, the first type processing element 111_3a and the second type processing element 111_3b may not necessarily be connected to all of the CGRA L0 memories 111_2, the instruction memories 111_1, and the LSUs 111_4, but may be connected to some of them.

Further, the first type processing elements 111_3a and the second type processing elements 111_3b may be different types of processing elements. Accordingly, among the CGRA L0 memory 111_2, the instruction memory 111_1, and the LSU 111_4, the element connected to the first type processing element 111_3a may be different from the element connected to the second type processing element 111_3b.

The neural core 101 with the CGRA structure is capable of high-level parallel computations and direct data exchanges between the first type processing elements 111_3a and the second type processing elements 111_3b, thus greatly saving power consumption. Further, inclusion of two or more types of first type processing elements 111_3a also enable optimization according to various computational works.

For example, if the first type processing element 111_3a is a processing element that performs two-dimensional computation, the second type processing element 111_3b may be a processing element that performs one-dimensional computation. However, aspects are not limited to the above.

Figure 26:
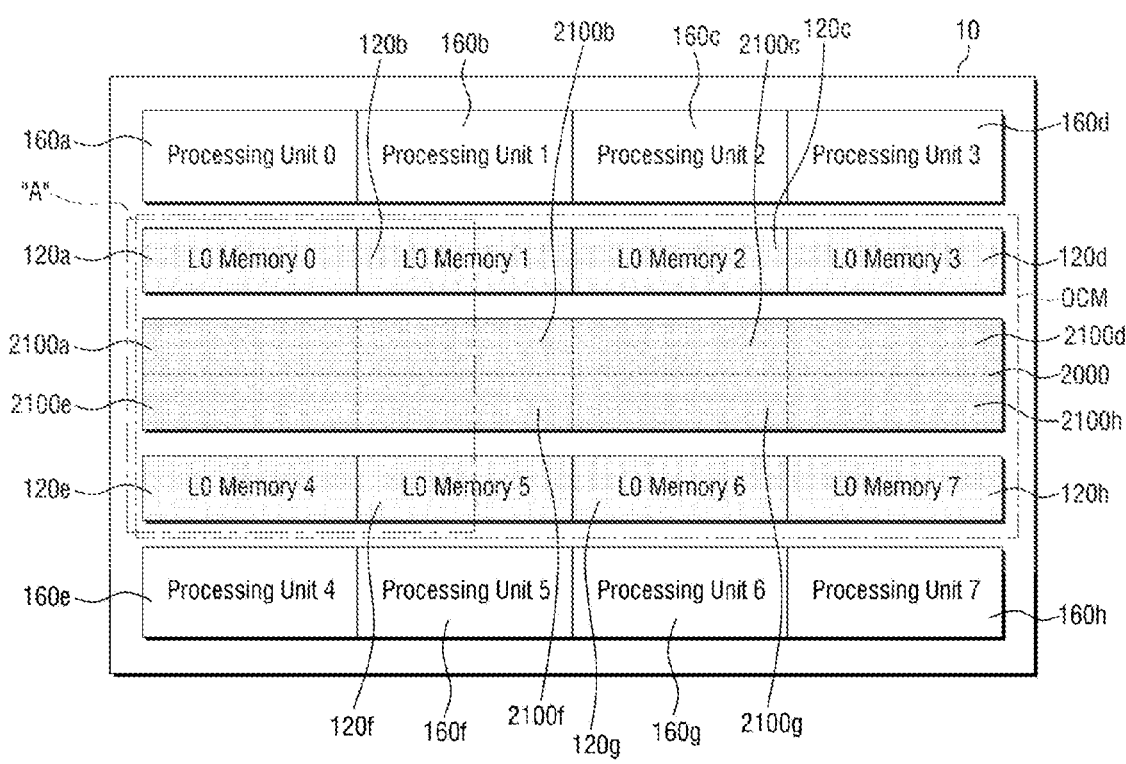
FIG. 26 is a block diagram provided to explain memory reorganization of the neural processing system.

FIG. 26 is a block diagram provided to explain memory reorganization of the neural processing system.

Referring to FIG. 26, the neural core SoC 10 may include first to eighth processing units 160a to 160h and an on-chip memory (OCM). Although FIG. 26 illustrates eight processing units as an example, this is only an example and the number of processing units may vary.

The on-chip memory (OCM) may include first to eighth L0 memories 120a to 120h and the shared memory 2000.

The first to eighth L0 memories 120a to 120h may be used as private memories for the first to eighth processing units 160a to 160h, respectively. That is, the first to eighth processing units 160a to 160h and the first to eighth L0 memories 120a to 120h may correspond to each other on a 1:1 basis.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be 8, which is same as the number of processing units and L0 memories.

The shared memory 2000 may operate in any one of two formats of the on-chip memory. That is, the shared memory 2000 may operate in any one of the L0 memory format or the global memory format. The shared memory 2000 may implement two logical memories with one hardware.

If the shared memory 2000 is implemented in the L0 memory format, the shared memory 2000 may operate as a private memory for each of the first to eighth processing units 160a to 160h, such as the first to eighth L0 memories 120a to 120h. The L0 memory may operate at a relatively higher clock speed compared to the global memory, and the shared memory 2000 may also use a relatively faster clock when operating in the L0 memory format.

If the shared memory 2000 is implemented in the global memory format, the shared memory 2000 may operate as a common memory used by both a first processing unit 100a and a second processing unit 100b. The shared memory 2000 may be shared not only by the first to eighth processing units 160a to 160h, but also by the first to eighth L0 memories 120a to 120h.

The global memory may generally use a lower clock than the L0 memory, but aspects are not limited thereto. If the shared memory 2000 operates in the global memory format, the first to eighth processing units 160a to 160h may share the shared memory 2000. In this case, the shared memory 2000 may be connected to the volatile memory 32 of FIG. 2 through the global interconnection 6000, and may operate as a buffer of the volatile memory 32.

At least part of the shared memory 2000 may operate in the L0 memory format, and the remainder of the shared memory may operate in the global memory format. That is, the entire shared memory 2000 may operate in the L0 memory format, or the entire shared memory 2000 may operate in the global memory format. Alternatively, part of the shared memory 2000 may operate in the L0 memory format, and the other of the shared memory may operate in the global memory format.

Figure 27:
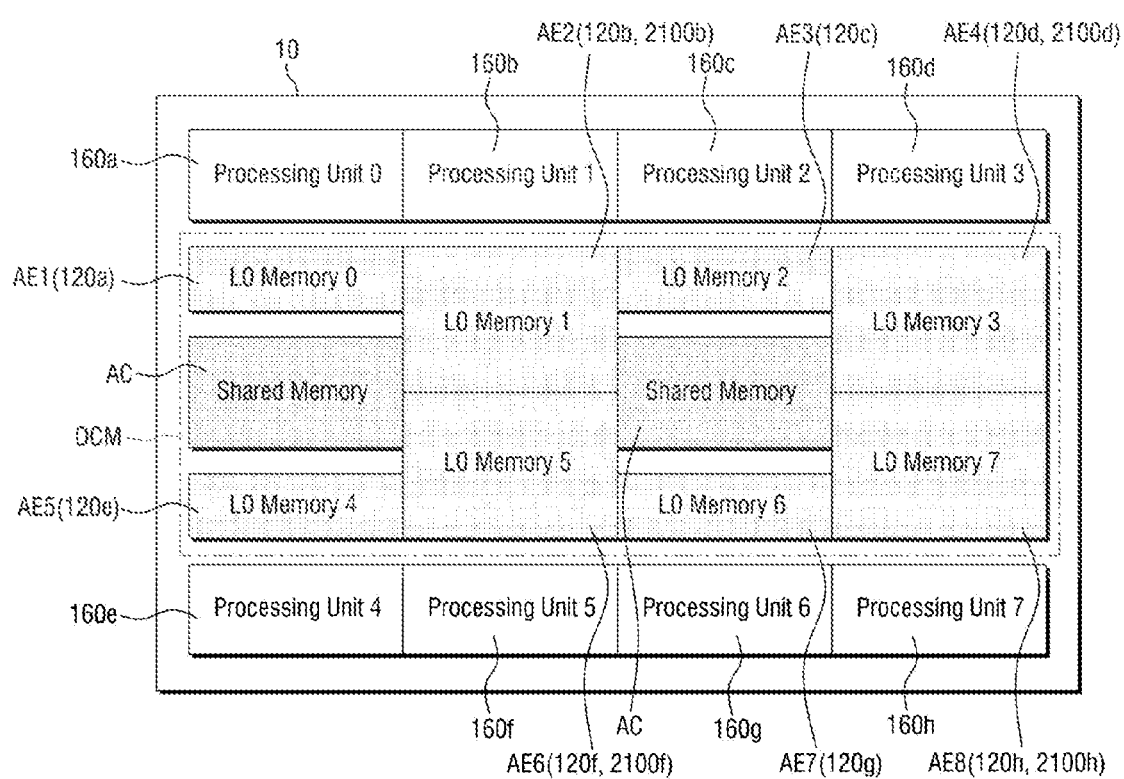
FIG. 27 is a block diagram provided to explain an example of memory reorganization of the neural processing system.

FIG. 27 is a block diagram provided to explain an example of memory reorganization of the neural processing system.

Referring to FIGS. 26 and 27, first, third, fifth, and seventh private areas AE1, AE3, AE5, and AE7 of each of the first, third, fifth, and seventh processing units 100a, 100c, 100c, and 100g may include only the first, third, fifth, and seventh L0 memories 120a, 120c, 120c, and 120g. In addition, second, fourth, sixth, and eighth private areas AE2, AE4, AE6, and AE8 of each of the second, fourth, sixth, and eighth processing units 100b, 100d, 100f, and 100h may include the second, fourth, sixth, and eighth L0 memories 120b, 120d, 120f, and 120h. In addition, the second, fourth, sixth, and eighth private areas AE2, AE4, AE6, and AE8 may include the second, fourth, sixth, and eighth memory units 2100b, 2100d, 2100f, and 2100h. The first, third, fifth, and seventh memory units 2100a, 2100c, 2100c, and 2100g of the shared memory 2000 may be used as a common area (AC).

The common area (AC) may be a memory shared by the first to eighth processing units 160a to 160h. The second private area (AE2) may include the second L0 memory 120b and the second memory unit 2100b. The second private area (AE2) may be an area where the hardware-separated second L0 memory 120b and second memory unit 2100b operate in the same manner so as to logically operate as one L0 memory. Further, the fourth, sixth, and eighth private areas AE4, AE6, and AE8 may operate in the same manner as the second private area (AE2).

The shared memory 2000 may be configured such that the areas corresponding to each neural core may be converted into an optimized ratio of logical L0 memories and logical global memories. The shared memory 2000 may perform adjustment of such ratio at run time.

That is, each neural core may perform the same works, or may perform different works. Accordingly, the capacity of the L0 memories and the capacity of the global memories required for the work performed by each neural core are different each time. Accordingly, if the ratio of the L0 memories and the shared memories is fixed as in the case of the related on-chip memory, inefficiency may occur due to the computational works assigned to each neural core.

Accordingly, the shared memory 2000 of the neural processing device can improve efficiency and speed of computation by setting an optimal ratio of the L0 memories and the global memories depending on the computational work at run time.

Figure 28:
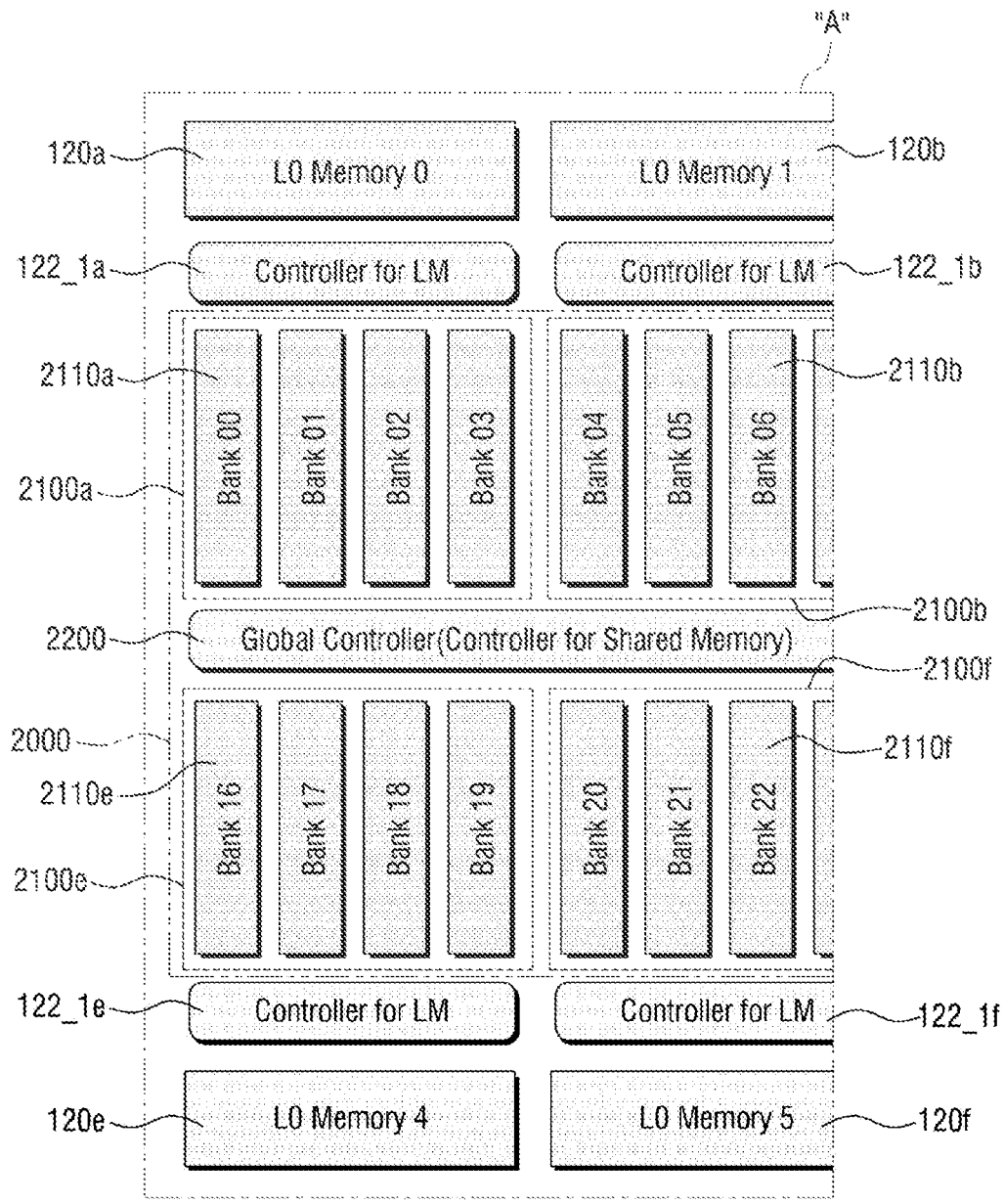
FIG. 28 is an enlarged block diagram of the area A in FIG. 26.

FIG. 28 is an enlarged block diagram of the area A in FIG. 26.

Referring to FIGS. 26 and 28, the shared memory 2000 may include a first L0 memory controller 122_1a, a second L0 memory controller 122_1b, a fifth L0 memory controller 122_1e, a sixth L0 memory controller 122_1f, first to eighth memory units 2100a to 2100h, and a global controller 2200. Although not illustrated, the other L0 memory controllers may also be included, but they will not be described herein for convenience of description.

The first L0 memory controller 122_1a may control the first L0 memory 120a. In addition, the first L0 memory controller 122_1a may control the first memory unit 2100a. Specifically, if the first memory unit 2100a is implemented in a logical L0 memory format, control by the first L0 memory controller 122_1a may be performed over the first memory unit 2100a.

The second L0 memory controller 122_1b may control the second L0 memory 120b. Further, the second L0 memory controller 122_1b may control the second memory unit 2100b. That is, if the second memory unit 2100b is implemented in the logical L0 memory format, control by the first L0 memory controller 122_1a may be performed over the second memory unit 2100b.

The fifth L0 memory controller 122_1e may control the fifth L0 memory 120c. Further, the fifth L0 memory controller 122_1e may control the fifth memory unit 2100c. That is, if the fifth memory unit 2100e is implemented in the logical L0 memory format, control by the fifth L0 memory controller 122_1e may be performed over the fifth memory unit 2100c.

The sixth L0 memory controller 122_1f may control the sixth L0 memory 120f. Further, the sixth L0 memory controller 122_1f may control the sixth memory unit 2100f. That is, if the sixth memory unit 2100f is implemented in the logical L0 memory format, control by the sixth L0 memory controller 122_1f may be performed over the sixth memory unit 2100f.

The global controller 2200 may control all of the first to eighth memory units 2100a to 2100h. Specifically, if each of the first to eighth memory units 2100a to 2100h logically operates in the global memory format (i.e., not logically operating in the L0 memory format), the global controller 2200 may control the first memory unit 2100a to eighth memory unit 2100h.

That is, each of the first to eighth memory units 2100a to 2100h may be controlled by the first to eighth L0 memory controllers 122_1a to 122_1h, or by the global controller 2200, depending on which of the memory formats they are implemented logically.

If the L0 memory controllers including the first, second, fifth, and sixth L0 memory controllers 122_1a, 122_1b, 122_1c, and 122_1f control the first to eighth memory units 2100a to 2100h, respectively, the first to eighth L0 memory controllers 122_1a to 141h, which control the first to eighth memory units 2100a to 2100h in the same manner as the first to eighth L0 memories 120a to 120h, may control as the private memories of the first to eighth processing units 160a to 160h. Accordingly, the first to eighth memory units 2100a to 2100h may operate at a clock frequency corresponding to the clock frequency of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110 of FIG. 8.

If the global controller 2200 controls at least one of the first to eighth memory units 2100a to 2100h, the global controller 2200 may control each of the first to eighth memory units 2100a to 2100h by the global memory of the first to eighth processing units 160a to 160h. Accordingly, at least one of the first to eighth memory units 2100a to 2100h may operate at a clock frequency not related to the clock frequencies of each of the first to eighth processing units 160a to 160h. However, aspects are not limited to the above.

The global controller 2200 may connect the first to eighth memory units 2100a to 2100h to the global interconnection 6000 of FIG. 3. The first to eighth memory units 2100a to 2100h may exchange data with the off-chip memory 30 of FIG. 2 by the global controller 2200, or exchange data with each of the first to eighth L0 memories 120a to 120h.

The first to eighth memory units 2100a to 2100h may each include at least one memory bank. The first memory unit 2100a may include at least one or more first memory banks 2110a. The first memory banks 2110a may be the areas of the first memory unit 2100a divided by a specific size. The first memory banks 2110a may all be the memory elements of a same size. However, aspects are not limited to the above. In FIG. 28, it is illustrated that four memory banks are included in one memory unit.

Similarly, the second, fifth, and sixth memory units 2100b, 2100e, and 2100f may include at least one second memory bank 2110b, at least one fifth memory bank 2110e, and at least one sixth memory bank 2110f, respectively.

Hereinbelow, the first memory bank 2110a and the fifth memory bank 2110e will be mainly described, but it is to be noted that the same applies to the other memory banks including the second and sixth memory banks 2110b and 2110f.

The first memory bank 2110a may logically operate in the L0 memory format or logically operate in the global memory format. The first memory bank 2110a may operate independently of the other memory banks in the first memory unit 2100a. However, aspects are not limited to the above.

If each memory bank operates independently, the first memory unit 2100a may include a first area operating in the same manner as the first L0 memory 120a, and a second area operating in a different manner from the first L0 memory 120a. The first area and the second area may not necessarily exist in parallel, and any one area may occupy the entire area of the first memory unit 2100a.

Likewise, the second memory unit 2100b may include a third area operating in the same manner as the second L0 memory 120b, and a fourth area operating in a different manner from the second L0 memory 120b. The third area and the fourth area may not necessarily exist in parallel, and any one area may occupy the entire area of the first memory unit 2100a.

The ratio of the first area and the second area may be different from the ratio of the third area and the fourth area. However, aspects are not limited to the above. Accordingly, the ratio of the first area and the second area may be same as the ratio of the third area and the fourth area. That is, the ratio of the memories configured in each memory unit may vary as desired.

In the related system-on-chip, high-density, low-power SRAM is used for configuring the on-chip memories excluding high-speed L0 memory. This is because SRAM has high efficiency in terms of chip size and power consumption compared to the required capacity. However, inefficiency occurs, because the processing speed of the related on-chip memory will considerably slow down if it is necessary to use the data that exceeds the predetermined capacity of the L0 memory quickly, and besides, there is no way to utilize the remaining global memory even when the need for the global memory is not so large.

Conversely, the shared memory 2000 according to some examples may be selectively controlled by one of the two controllers if necessary. In this case, the shared memory 2000 may not be controlled as a whole by only one of the two controllers, but may be independently controlled on a memory unit basis or a memory bank basis.

Through this, the shared memory 2000 may obtain the optimal ratio of memories according to the computational work during run time, and may thus be able to perform faster and more efficient computational work. For the processing unit specialized for artificial intelligence, different sizes of the L0 memory and global memory may be needed on a specific application basis. Further, even for the same application, if a deep learning network is used, the sizes of the L0 memory and global memory required for each layer may vary. The shared memory 2000 may enable fast and efficient deep learning work because the memory ratio can change during run time according to changes in the computation steps of each layer.

Figure 29:
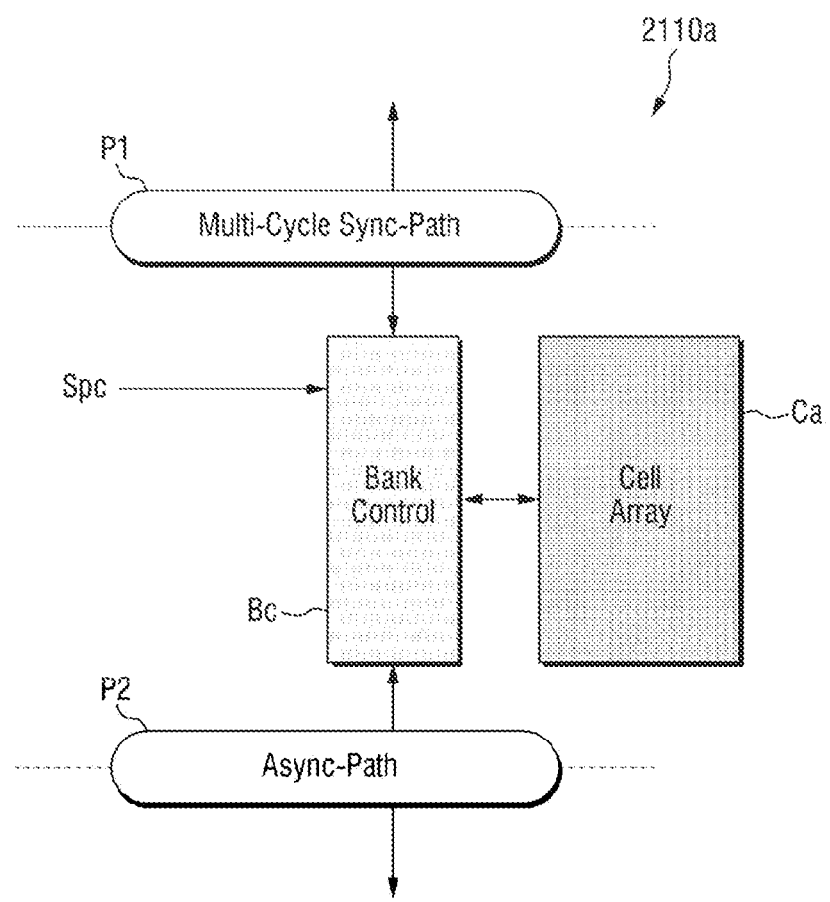
FIG. 29 is a diagram provided to explain the first memory bank of FIG. 28 in detail.

FIG. 29 is a diagram provided to explain the first memory bank of FIG. 28 in detail.

Although FIG. 29 illustrates the first memory bank 2110a, the other memory banks may also have the same structure as the first memory bank 2110a.

Referring to FIG. 29, the first memory bank 2110a may include a cell array (Ca), a bank controller (Bc), a first path unit (P1), and a second path unit (P2).

The cell array (Ca) may include a plurality of memory elements (Cells) therein. For the cell array (Ca), a plurality of memory elements may be aligned and disposed in lattice structure. For example, the cell array (Ca) may be a Static Random Access Memory (SRAM) cell array.

The bank controller (Bc) may control the cell array (Ca). The bank controller (Bc) may determine whether the cell array (Ca) is to operate in the L0 memory format or the global memory format, and control the cell array (Ca) accordingly.

Specifically, the bank controller (Bc) may determine during run time whether to transmit and receive data in a direction of the first path unit (P1) or in a direction of the second path unit (P2). The bank controller (Bc) may determine a direction of transmitting and receiving data according to the path control signal (Spc).

The path control signal (Spc) may be generated by a previously designed device driver or compiler. The path control signal (Spc) may be generated according to the features of the computational work. Alternatively, the path control signal (Spc) may be generated by the input received from the user. That is, user may directly apply the input to the path control signal (Spc) in order to select the most optimal memory ratio.

The bank controller (Bc) may determine, through the path control signal (Spc), a path for transmitting and receiving the data stored in the cell array (Ca). The data exchange interface may vary according to the determination of the bank controller (Bc) regarding the path for transmitting and receiving the data. That is, the bank controller (Bc) may use a first interface for exchanging data with the first path unit (P1), and use a second interface for exchanging data with the second path unit (P2). The first interface and the second interface may be different from each other.

Further, an address system for storing the data may vary. That is, if a specific interface is selected, read and write operations may be performed by the corresponding address system.

The bank controller (Bc) may operate at a specific clock frequency. For example, if the cell array (Ca) is an SRAM cell array, the bank controller (Bc) may operate at a general SRAM operating clock frequency.

The first path unit (P1) may be connected to the bank controller (Bc). The first path unit (P1) may directly exchange data of the cell array (Ca) with the first processing unit 100a. By "direct" exchange, it may mean exchange without intervention of the global interconnection 6000. That is, the first processing unit 100a may directly exchange data with the first L0 memory 120a, and the first processing unit 100a may exchange data through the first path unit (P1) when the shared memory 2000 is logically implemented in the L0 memory format. The first path unit (P1) may include the L0 memory controllers including the first L0 memory controller 122_1a and the second L0 memory controller 122_1b of FIG. 28. The first path unit (P1) may configure a multi-cycle sync path. That is, the operating clock frequency of the first path unit (P1) may be the same as the operating clock frequency of the first processing unit 100a. The first L0 memory 120a may quickly exchange data at the same clock frequency as the operating clock frequency of the first processing unit 100a so as to quickly exchange data with the same speed as that of the operation of the first processing unit 100a. The first path unit (P1) may also operate at the same clock frequency as the operating clock frequency of the first processing unit 100a.

The operating clock frequency of the first path unit (P1) may be a multiple of the operating clock frequency of the bank controller (Bc). In this case, clock domain crossing (CDC) work for clock synchronization between the bank controller (Bc) and the first path unit (P1) is not required, and accordingly, a delay in data transmission may not occur. Accordingly, faster and more efficient data exchange is possible.

In FIG. 29, for example, the operating clock frequency of the first path unit (P1) may be 1.5 GHZ. This may be two times the frequency of 750 MHz of the bank controller (Bc). However, aspects are not limited to the above, and other examples are possible as long as the first path unit (P1) operates at an integer multiple of the clock frequency of the bank controller (Bc).

The second path unit (P2) may be connected to the bank controller (Bc). The second path unit (P2) may exchange data of the cell array (Ca) through the global interconnection 6000 instead of directly exchanging the data with the first processing unit 100a. That is, the first processing unit 100a may exchange the data with the cell array (Ca) through the global interconnection 6000 and the second path unit (P2). The cell array (Ca) may exchange the data with not only the first processing unit 100a but also the other neural cores.

That is, the second path unit (P2) may be a data exchange path between the cell array (Ca) and all of the neural cores, if the first memory bank 2110a is logically implemented in the global memory format. The second path unit (P2) may include the global controller 2200 of FIG. 23.

The second path unit (P2) may configure async-path. The operating clock frequency of the second path unit (P2) may be the same as that of the global interconnection 6000. The second path unit (P2) may also operate at the same clock frequency as the operating clock frequency of the global interconnection 6000.

The operating clock frequency of the second path unit (P2) may not be synchronized with the operating clock frequency of the bank controller (Bc). In this case, a clock domain crossing (CDC) work may be required to synchronize the clocks between the bank controller (Bc) and the second path unit (P2). If the operating clock frequency of the bank controller (Bc) and the operating clock frequency of the second path unit (P2) are not synchronized with each other, the degree of freedom in designing the reference clock may increase. Accordingly, difficulty of hardware design can be lowered and hardware operation may be derived more easily.

The bank controller (Bc) may use different address systems when exchanging data through the first path unit (P1) and when exchanging data through the second path unit (P2). That is, the bank controller (Bc) may use a first address system through the first path unit (P1) and use a second address system through the second path unit (P2). The first address system and the second address system may be different from each other.

The bank controller (Bc) may not necessarily exist for each memory bank. That is, because the bank controller (Bc) is not a part of scheduling, but plays a role of transmitting signals, it is not an essential part for each memory bank having two ports. Therefore, one bank controller (Bc) may control several memory banks. Even when the bank controller (Bc) controls the several memory banks, the several memory banks may operate independently. However, aspects are not limited to the above.

Of course, the bank controller (Bc) may exist for each memory bank. In this case, the bank controller (Bc) may individually control each memory bank.

Referring to FIGS. 28 and 29, the first memory unit 2100a may use the first address system for exchanging data through the first path unit (P1), and use the second address system for exchanging data through the second path unit (P2). Similarly, the second memory unit 2100b may use the third address system for exchanging data through the first path unit (P1), and use the second address system for exchanging data through the second path unit (P2). The first address system and the third address system may be the same as each other. However, aspects are not limited to the above.

The first address system and the third address system may be used exclusively for the first processing unit 100a and the second processing unit 100b, respectively. The second address system may be commonly applied to the first processing unit 100a and the second processing unit 100b.

In FIG. 29, for example, the second path unit (P2) may operate at an operating clock frequency of 1 GHz. This frequency may not be synchronized with 750 MHz of the operating clock frequency of the bank controller (Bc). That is, the operating clock frequency of the second path unit (P2) may be freely set and may not be dependent on the operating clock frequency of the bank controller (Bc).

In the general global memory that uses a slow SRAM (e.g., 750 MHZ) with a faster global interconnection (e.g., 1 GHZ), delay inevitably occurs according to CDC work. Conversely, because it is possible that the shared memory 2000 according to some examples uses the first path unit (P1) in addition to the second path unit (P2), delay according to CDC work can be avoided.

Further, because a plurality of neural cores use a single global interconnection 6000 in the general global memory, decrease in overall processing speed easily occurs when data transmission traffics occur simultaneously. Conversely, it is possible that the shared memory 2000 according to some examples uses the first path unit (P1) in addition to the second path unit (P2), thereby providing effects of dispersing the data processing load congesting the global controller 2200.

Figure 30:
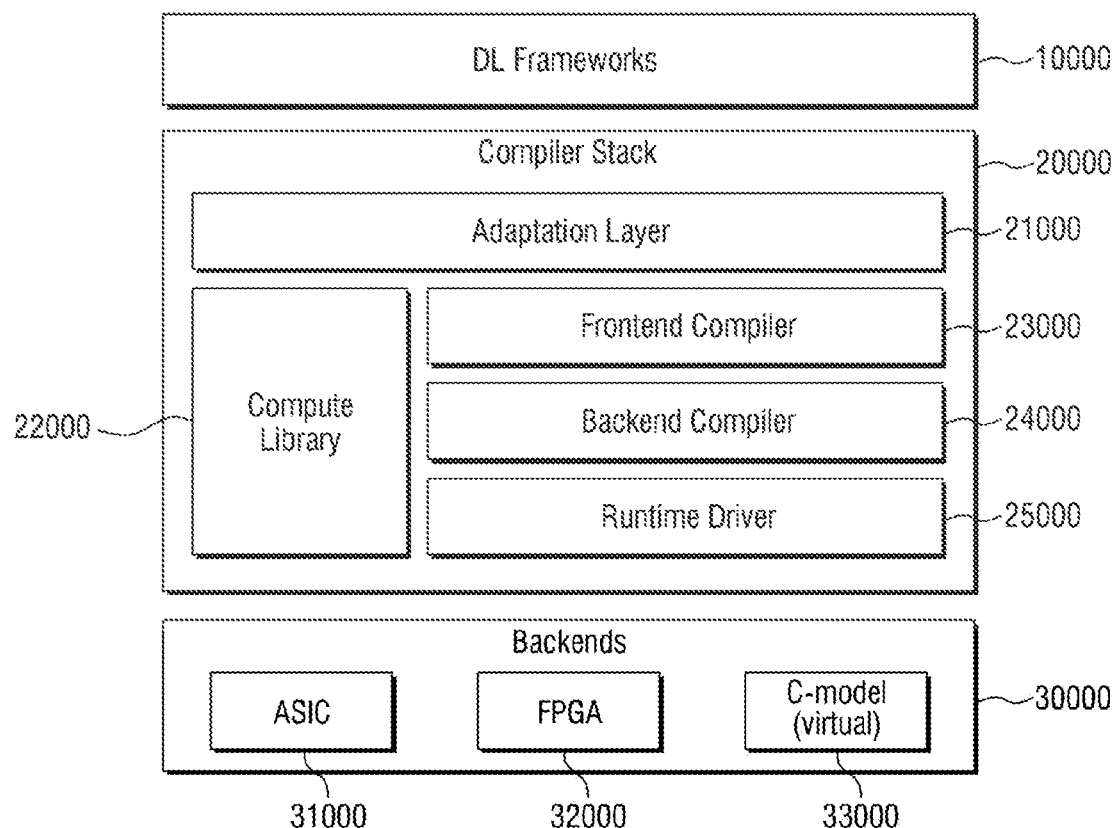
FIG. 30 is a block diagram provided to explain a software hierarchical structure of the neural processing device.

FIG. 30 is a block diagram provided to explain a software hierarchical structure of the neural processing device.

Referring to FIG. 30, the software layer structure of the neural processing device according to some examples may include a DL framework 10000, a compiler stack 20000, and a backend module 30000.

The DL framework 10000 may refer to a framework for a deep learning model network used by the user. For example, a fully trained neural network may be generated using programs such as TensorFlow or PyTorch.

The compiler stack 20000 may include an adaptation layer 21000, a compute library 22000, a frontend compiler 23000, a backend compiler 24000, and a runtime driver 25000.

The adaptation layer 21000 may be a layer in contact with the DL framework 10000. The adaptation layer 21000 may quantize the user's neural network model generated in the DL framework 10000 and modify the graph. In addition, the adaptation layer 21000 may convert the type of the model into a required type.

The frontend compiler 23000 may convert various neural network models and graphs received from the adaptation layer 21000 into a certain intermediate representation (IR). The converted IR may be a preset expression that is easy to handle later in the backend compiler 24000.

The IR of the frontend compiler 23000 may be optimized in advance at the graph level. In addition, the frontend compiler 23000 may generate the IR by way of conversion into a hardware-optimized layout.

The backend compiler 24000 optimizes the IR converted in the frontend compiler 23000, and converts this into a binary file for use by the runtime driver. The backend compiler 24000 may generate optimized code by dividing the job at a scale that matches the details of the hardware.

Among various operations, the compute library 22000 may store template operations designed in a form suitable for hardware. The compute library 22000 provides the backend compiler 24000 with several template operations that require hardware, thereby generating optimized code.

During operation, the runtime driver 25000 may continuously perform monitoring so as to operate the neural network device according to some examples. Specifically, it may be responsible for executing the interface of the neural network device.

The backend module 30000 may include an application specific integrated circuit (ASIC) 31000, a field programmable gate array (FPGA) 32000, and a C-model 33000. The ASIC 31000 may refer to a hardware chip determined according to a predetermined way of design. The FPGA 32000 may be a programmable hardware chip. The C-model 33000 may refer to a model implemented by simulating hardware on software.

The backend module 30000 may perform various works and derive results using binary code generated through the compiler stack 20000.

Figure 31:
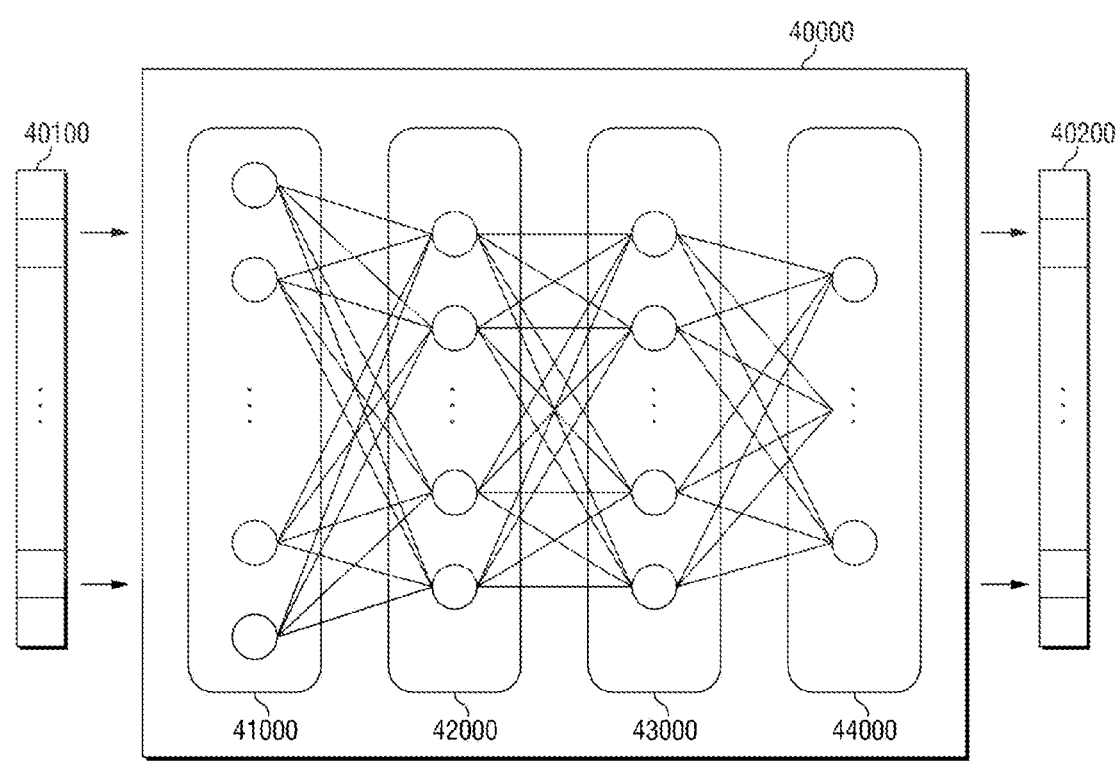
FIG. 31 is a conceptual diagram provided to explain deep learning computation performed by the neural processing device.

FIG. 31 is a conceptual diagram provided to explain a deep learning computation performed by the neural processing device.

Referring to FIG. 31, in machine learning technology and cognitive science, an artificial neural network model 40000 as an example of the machine learning model refers to a statistical learning algorithm implemented based on a structure of a biological neural network, or to a structure that executes such algorithm.

The artificial neural network model 40000 may represent a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, the artificial neural network model 40000 may include any probability model, neural network model, and the like, that is used in artificial intelligence training methods such as machine learning and deep learning.

The neural processing device according to some examples may perform computations by implementing this form of artificial neural network model 40000. For example, the artificial neural network model 40000 may receive an input image and output information on at least a portion of the object included in the input image.

The artificial neural network model 40000 is implemented as a multilayer perceptron (MLP) formed of multiple nodes and connections between them. The artificial neural network model 40000 may be implemented using one of various artificial neural network model structures including the MLP. As illustrated in FIG. 30, the artificial neural network model 40000 includes an input layer 41000 to receive an input signal or data 40100 from the outside, an output layer 44000 to output an output signal or data 40200 corresponding to the input data, and (n) number of hidden layers 42000 to 43000 (where n is a positive integer) positioned between the input layer 41000 and the output layer 44000 to receive a signal from the input layer 41000, extract the features, and transmit the features to the output layer 44000. The output layer 44000 receives signals from the hidden layers 42000 to 43000 and outputs the same to the outside.

The method of training the artificial neural network model 40000 includes the supervised learning that trains to optimize for solving a problem with inputs of teacher signals (correct answers), and the unsupervised learning that does not require a teacher signal.

The neural processing device may directly generate the training data for training the artificial neural network model 40000 through simulation. As described above, the input layer 41000 and the output layer 44000 of the artificial neural network model 40000 are respectively matched with a plurality of output variables corresponding to a plurality of input variables, and as the synaptic values between nodes included in the input layer 41000, the hidden layers 42000 to 43000, and the output layer 44000 are adjusted, training can be processed to extract a correct output corresponding to a specific input. Through this training process, the features hidden in the input variables of the artificial neural network model 40000 may be confirmed, and the synaptic values (or weights) between the nodes of the artificial neural network model 40000 may be adjusted so as to reduce the errors between the output variable calculated based on the input variable and the target output.

Figure 32:
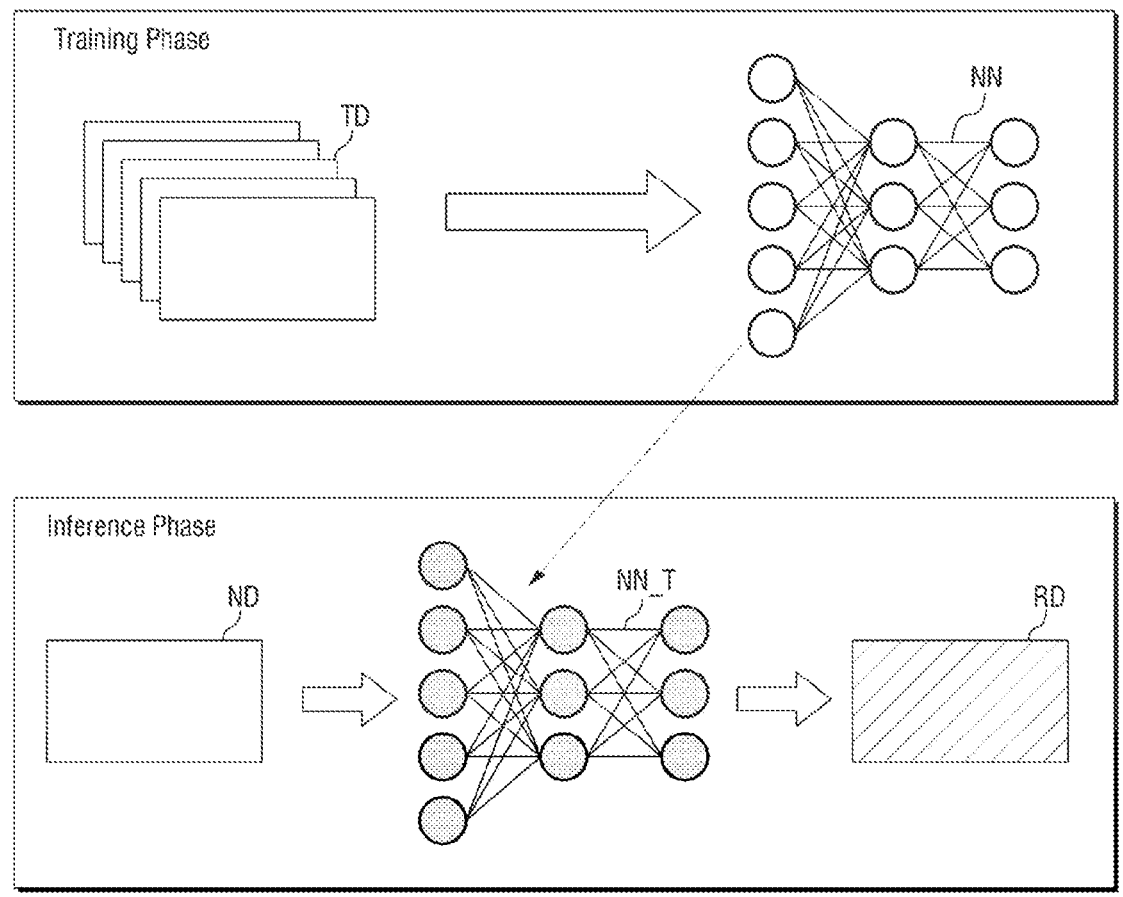
FIG. 32 is a conceptual diagram provided to explain training and inference operations of the neural network of the neural processing device.

FIG. 32 is a conceptual diagram provided to explain training and inference operations of the neural network of the neural processing device.

Referring to FIG. 32, in the training phase, a plurality of training data (TD) may go through the process of being forwarded to the artificial neural network model (NN) and then backwarded. Through this, the weights and biases of each node of the artificial neural network model (NN) are adjusted, and this allows the model to be trained to produce increasingly accurate results. Through this training phase, the artificial neural network model (NN) may be converted into the trained neural network model (NN_T).

In the inference phase, new data (ND) may be input back to the trained neural network model (NN_T). The trained neural network model (NN_T) may take the new data (ND) as input and derive the result data (RD) through previously trained weights and biases. For this result data (RD), which training materials (TD) are used in the training phase and how many training materials (TD) are used may be important.

Hereinafter, a clock gating method of a neural processor according to some aspects will be described with reference to FIG. 33. The components or operations that overlap with those of the examples described above will be omitted or simplified. For the clock gating method, reference may be made to FIGS. 1 to 32 and the related description provided above.

Figure 33:
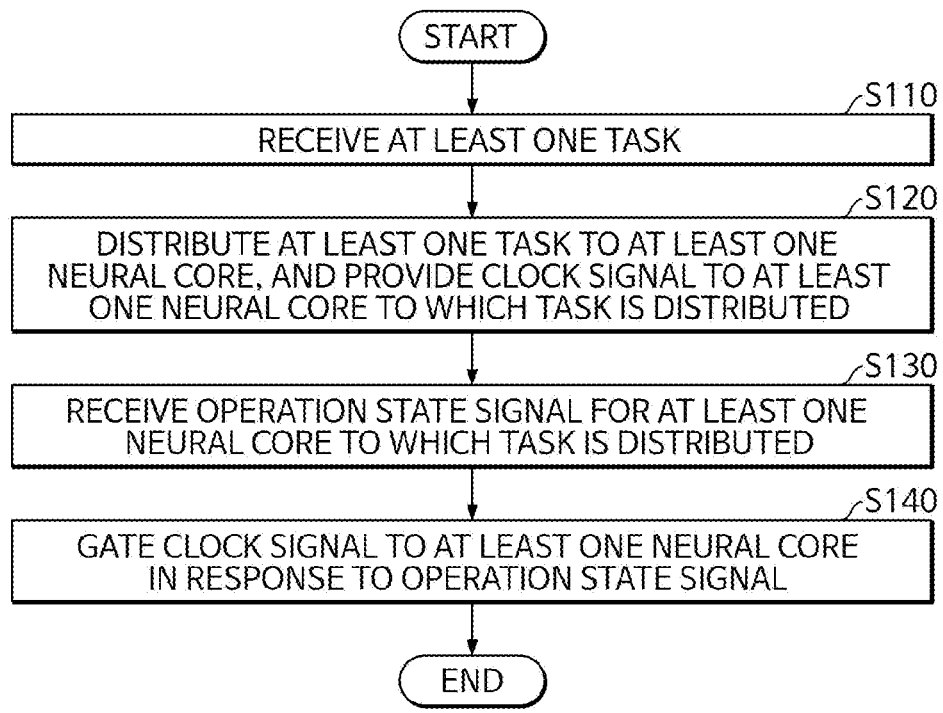
FIG. 33 is a flowchart provided to explain a clock gating method of the neural processor.

FIG. 33 is a flowchart provided to explain the clock gating method of a neural processor.

Referring to FIG. 33, the clock gating method of the neural processor includes receiving at least one task (S110), distributing the at least one task to at least one neural core, and providing a clock signal to the at least one neural core to which the task is distributed (S120), receiving an operation state signal for the at least one neural core to which the task is distributed (S130), and gating the clock signal to the at least one neural core in response to the operation state signal (S140).

At S110, at least one task may be received at the neural processor 1000. The task manager 600 of the neural processor 1000 may receive the at least one task from the command processor 7000. The at least one task may have a defined data flow architecture. The data flow architecture may include related task information to perform the at least one task. That is, the at least one task provided as described above may have defined dependency information.

Further, at S110, a plurality of tasks may be received, which may be a group of tasks with sequential dependencies.

Further, the operation at S110 may include receiving a clock signal at the neural processor 1000. The L2 clock controller 8000 may selectively distribute the clock signals to the L1 clock controller 800 of the neural processor 1000 to which the tasks are distributed. The L2 clock controller 8000 may be controlled by the command processor 7000 via the first clock control signal CCS1. The L1 clock controller 800 may distribute the provided clock signals to enable the main components of the neural processor 1000 to operate.

At S120, the task manager 600 may check the defined dependencies between the tasks provided from the command processor 7000 and provide the task completed with the dependency check to the neural core 100 through the core global 500.

Further, the L1 clock controller 800 may be controlled by the task manager 600 via the second clock control signal CCS2. At S120, the L1 clock controller 800 may selectively transmit the clock signals to the neural core 100 to which the task was provided via the second clock control signal CCS2.

At S130, the operation state signal for the at least one neural core to which the task was distributed is received, and at S140, the clock signal is gated to the at least one neural core in response to the operation state signal.

The L1 clock controller 800 may include the master clock gate 800_gm that receives the second clock control signal CCS2 and the clock signal CLK provided from the L2 clock controller, and at least one slave clock gate 800_gs that receives the clock signal from the master clock gate 800_gm and selectively provides the clock signal to the corresponding neural core. The slave clock gate 800_gs may include the first to n-th slave clock gates 800_gs1 to 800_gsn corresponding to the first to n-th neural cores 100_1 to 100_n, respectively.

In some aspects, the slave clock gate 800_gs may gate the clock signal according to an operation state from the corresponding neural core 100. The slave clock gate 800_gs may receive an operation state signal PSS from the corresponding neural core 100 and provide the clock signal to the corresponding neural core 100 based on the operation state signal PSS. The slave clock gate 800_gs may provide a clock signal to the corresponding neural core 100 according to the operation state signal PSS. The operation state signal PSS may be a signal indicating the current state of the neural core. In some aspects, the operation state signal PSS may be transmitted to the corresponding slave clock gate 800_gs according to a predetermined period, but aspects are not limited thereto. In some aspects, the operation state signal PSS may be provided to the slave clock gate 800_gs in response to event conditions associated with the processing module (PM), e.g., in response to a completion signal indicating the end of a computation performed in the neural core 100.

In some aspects, the operation state signal PSS may indicate busy, wait, or quiesce state of the neural core. The busy state corresponds to a state in which the processing module (PM) is currently performing a computation, that is, in an operation state. The wait state refers to a state in which the processing module (PM) is waiting for the start of the execution of a task according to the data flow architecture. The quiesce state may refer to a state in which the processing module (PM) has completed the computation for the task and ended the computation. The slave clock gate 800_gs may gate the clock signal provided to the processing module (PM), if the state of the corresponding processing module (PM) is wait or quiesce state.

The above description is merely illustrative of the technical idea of the examples, and those of ordinary skill in the art to which the examples pertain will be able to make various modifications and variations without departing from the essential characteristics of the examples. Accordingly, the examples are not intended to limit the technical idea of the examples, but to explain the technical idea, and the scope of the technical idea of the examples is not limited by these examples. The scope of protection of the examples should be interpreted in accordance with the claims below, and all technical ideas within the equivalent scope should be interpreted as being included in the scope of claims of the examples.

The invention claimed is:

1. A neural processor comprising:
   a plurality of neural cores, each of which processes at least one task; and
   a clock controller that selectively gates, according to a data flow architecture of the at least one task, a clock signal provided to the plurality of neural cores,
   wherein the clock controller comprises:

a master clock gate configured to receive the clock signal from an outside to generate a first gated clock signal; and
a plurality of slave clock gates associated with the plurality of neural cores, respectively, wherein a respective one of the plurality of slave clock gates is configured to receive the first gated clock signal from the master clock gate, and selectively gate the first gated clock signal to provide a second gated clock signal to an associated neural core,
wherein each of the plurality of neural cores comprises a processing module that performs a computation, and an operation controller that identifies an operation state of the processing module based on the data flow architecture,
wherein the operation controller generates an operation state signal based on the operation state of the processing module, and
wherein a respective one of the plurality of slave clock gates receives the operation state signal from the operation controller of the associated neural core, and gates, based on the operation state signal, the first gated clock signal to provide the second gated clock signal to the processing module of the associated neural core.

2. The neural processor of claim 1, wherein the operation state signal indicates a busy state, a wait state of the plurality of neural cores, and
wherein, the respective one of the plurality of slave clock gates gates the first gated clock signal to provide the second gated clock signal to the processing module of the associated neural core if a state of the associated neural core is the wait state or the quiesce state.

3. The neural processor of claim 1, wherein the plurality of neural cores includes first to n-th neural cores that sequentially process first to n-th tasks according to the data flow architecture,
wherein the plurality of slave clock gates includes first to n-th slave clock gates associated with the first to n-th neural cores,
wherein the n-th neural core that performed the n-th task provides an n-th task completion signal to the n-th slave clock gate and the master clock gate, and
wherein said n is a natural number more than or equal to 2.

4. The neural processor of claim 3, wherein the master clock gate gates the clock signal from an outside to provide the first gated clock signal to the first to n-th slave clock gates which provide the second gated clock signal to the first to n-th neural cores, respectively, in response to the n-th task completion signal.

5. The neural processor of claim 3, wherein the n-th operation controller of the n-th neural core waits for an n−1-th task completion signal of an n−1-th neural core, which is a preceding neural core, according to the data flow architecture, and
wherein the n-th operation controller switches the operation state of the n-th processing module of the n-th neural core from an idle state to a busy state in response to the n−1-th task completion signal, and transmits the operation state signal switched to the busy state to the n-th slave clock gate, in order to provide a clock signal required for an operation of the n-th processing module.

6. The neural processor of claim 1, further comprising a task manager that distributes the at least one task to the plurality of neural cores according to the data flow architecture,
wherein the clock controller selectively provides, based on a clock control signal provided from the task manager, the second gated clock signal provided to the plurality of neural cores.

7. The neural processor of claim 6, wherein the clock control signal includes information on a neural core to which the at least one task is distributed, and
the clock controller provides, according to the clock control signal, the clock signal to the neural core to which the at least one task is distributed.

8. A neural processing device comprising:
a command processor that configures a task group including at least one task for processing a provided command so as to define a data flow architecture;
a plurality of neural processors, each of which includes a plurality of neural cores for processing the task according to the defined data flow architecture; and
an L2 clock controller that selectively gates, based on the data flow architecture, a clock signal provided to the plurality of neural processors,
wherein the respective one of the plurality of neural processors includes an L1 clock controller that selectively gates, according to the data flow architecture, the clock signal provided to the plurality of neural cores
wherein the L1 clock controller includes:
a master clock gate configured to receive the clock signal from an outside to generate a first gated clock signal; and
a plurality of slave clock gates associated with the plurality of neural cores, respectively, wherein a respective one of the plurality of slave clock gates is configured to receive the first gated clock signal from the master clock gate, and selectively gate the first gated clock signal to provide a second gated clock signal to an associated neural core,
wherein each of the plurality of neural cores includes a processing module that performs a computation, and an operation controller that controls an operation of the processing module based on the data flow architecture,
wherein the operation controller generates an operation state signal based on the operation state of the processing module, and
wherein a respective one of the plurality of slave clock gates receives the operation state signal from the operation controller of the associated neural core, and gates, based on the operation state signal, the first gated clock signal to provide the second gated clock signal to the processing module of the associated neural core.

9. The neural processing device of claim 8, wherein the operation state signal indicates a busy state, a wait state, or a quiesce state of the at least one neural core,
wherein the respective one of the plurality of slave clock gates gates the first gated clock signal to provide the second gated clock signal to the processing module of the associated neural core if the associated neural core is in the wait state or quiesce state, and
wherein the respective one of the plurality of slave clock gates provides the clock signal for an operation of the operation controller even if the clock signal provided to the processing module is gated.

10. The neural processing device of claim 8, wherein the at least one neural core includes first to n-th neural cores that sequentially process first to n-th tasks according to the data flow architecture,
wherein the plurality of slave clock gates includes first to n-th slave clock gates associated with the first to n-th neural cores, wherein the n-th neural core that performed the n-th task provides an n-th task completion signal to the n-th slave clock gate and the master clock gate, and wherein the master clock gate gates clock signals provided to the first to n-th neural cores in response to the n-th task completion signal, wherein said n is a natural number more than or equal to 2.

11. The neural processing device of claim 10, wherein the n-th operation controller of the n-th neural core waits for an n−1-th task completion signal of an n−1-th neural core, which is a preceding neural core, according to the data flow architecture, and wherein the n-th operation controller switches the operation state of the n-th processing module of the n-th neural core from idle to busy state in response to the n−1-th task completion signal, and transmits the operation state signal switched to the busy state to the n-th slave clock gate to provide a clock signal required for an operation of the n-th processing module.

12. The neural processing device of claim 8, wherein the L2 clock controller is configured to selectively provide the clock signal to a respective one of the plurality of neural processors to which the task group is distributed, in response to a first clock control signal provided from the command processor.

13. The neural processing device of claim 12, wherein the neural processor further includes a task manager that distributes the at least one task to the plurality of neural cores according to the data flow architecture, wherein the L1 clock controller selectively provides the second gated clock signal to the plurality of neural cores based on a second clock control signal provided from the task manager.

14. A clock gating method performed by a neural processor including a task manager, a master clock gate, a plurality of slave clock gates and a plurality of neural cores, comprising:

receiving, by the task manager, at least one task;

distributing, by the task manager, the at least one task to the plurality of neural cores;

gating, by the master clock gate, the clock signal from the neural processor to generate a first gated clock signal;

receiving, by a respective one of the plurality of slave clock gates, the first gated clock signal and an operation state signal from an associated neural core; and gating, by the respective one of the plurality of the slave clock gates, the first gated clock signal in response to the operation state signal to generate a second gated clock signal, and providing the second gated clock signal to the an associated neural core.

15. The clock gating method of claim 14, wherein the operation state signal indicates a busy state, a wait state, or a quiesce state of the plurality of neural cores, and wherein the gating the first gated clock signal in response to the operation state signal includes, gating the first gated clock signal if the associated neural core is in the wait or quiesce state.

* * * * *